US012689856B2

(12) United States Patent
Lee

(10) Patent No.: US 12,689,856 B2
(45) Date of Patent: Jul. 21, 2026

(54) MOVABLE TV AND METHOD FOR CONTROLLING THE SAME

(71) Applicant: LG ELECTRONICS INC., Seoul (KR)

(72) Inventor: Donghee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 230 days.

(21) Appl. No.: 18/359,605

(22) Filed: Jul. 26, 2023

(65) Prior Publication Data

US 2024/0064461 A1 Feb. 22, 2024

(30) Foreign Application Priority Data

Aug. 16, 2022 (KR) ........................ 10-2022-0102020

(51) Int. Cl.
| | |
|---|---|
| *H04R 3/00* | (2006.01) |
| *G10K 11/178* | (2006.01) |
| *H04N 5/64* | (2006.01) |
| *H04N 21/426* | (2011.01) |

(52) U.S. Cl.
CPC ......... *H04R 3/00* (2013.01); *G10K 11/17823* (2018.01); *G10K 11/17873* (2018.01); *G10K 2210/129* (2013.01); *G10K 2210/3027* (2013.01); *H04N 5/64* (2013.01); *H04N 21/426* (2013.01); *H04R 2430/01* (2013.01)

(58) Field of Classification Search
CPC ............ H04R 2430/01; H04R 2499/15; G10K 11/17823; G06F 3/165; H04N 21/439
See application file for complete search history.

(56) References Cited

U.S. PATENT DOCUMENTS

| | | | |
|---|---|---|---|
| 2003/0067535 A1 | 4/2003 | Creed et al. | |
| 2018/0075403 A1* | 3/2018 | Mascorro Medina | ...................... |
| | | | B25J 9/1697 |
| 2020/0248988 A1 | 8/2020 | Perez | |
| 2021/0026592 A1 | 1/2021 | Park et al. | |
| 2021/0270858 A1* | 9/2021 | Imai ..................... | G01N 1/2202 |
| 2021/0304559 A1* | 9/2021 | Cupersmith ........... | B25J 19/023 |
| 2022/0020359 A1* | 1/2022 | Vitzrabin .................. | G06F 3/14 |
| 2023/0097522 A1* | 3/2023 | Mehrabi ................. | G10L 25/51 |
| | | | 381/56 |

FOREIGN PATENT DOCUMENTS

| | | |
|---|---|---|
| EP | 1542193 | 6/2005 |
| KR | 101965530 | 4/2019 |

OTHER PUBLICATIONS

U.S. Appl. No. 63/261,890 specification corresponding to US 20230067522, filed Sep. 30, 2021.*

(Continued)

*Primary Examiner* — James K Mooney
(74) *Attorney, Agent, or Firm* — LEE, HONG, DEGERMAN, KANG & WAIMEY

(57) ABSTRACT

Disclosed is a method for controlling a movable TV including outputting audio data and video data of content at a first location, moving the TV from the first location to a second location, receiving state information of an external device belonging to a specific group located around the second location, and adjusting a volume level of the audio data while maintaining the output of the video data based on the received state information.

16 Claims, 23 Drawing Sheets

(56)     References Cited

OTHER PUBLICATIONS

European Patent Office Application Serial No. 23190566.2, Partial
Search Report dated Jan. 2, 2024, 10 pages.
Korean Intellectual Property Office Application No. 10-2022-
0102020, Office Action dated Apr. 8, 2024, 4 pages.
European Patent Office Application Serial No. 23190566.2, Search
Report dated Apr. 18, 2024, 9 pages.

* cited by examiner

【Fig.1】
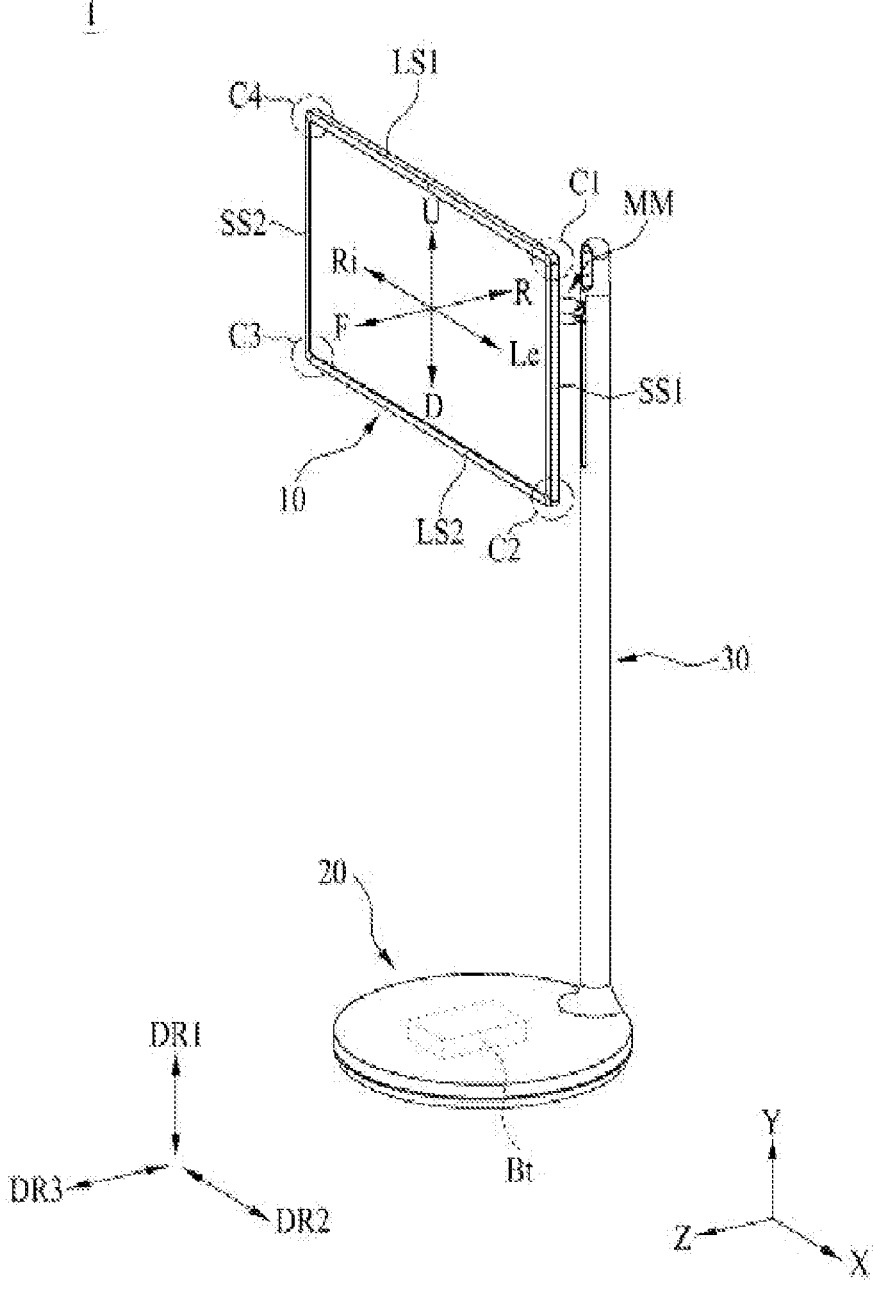

[Fig. 2]
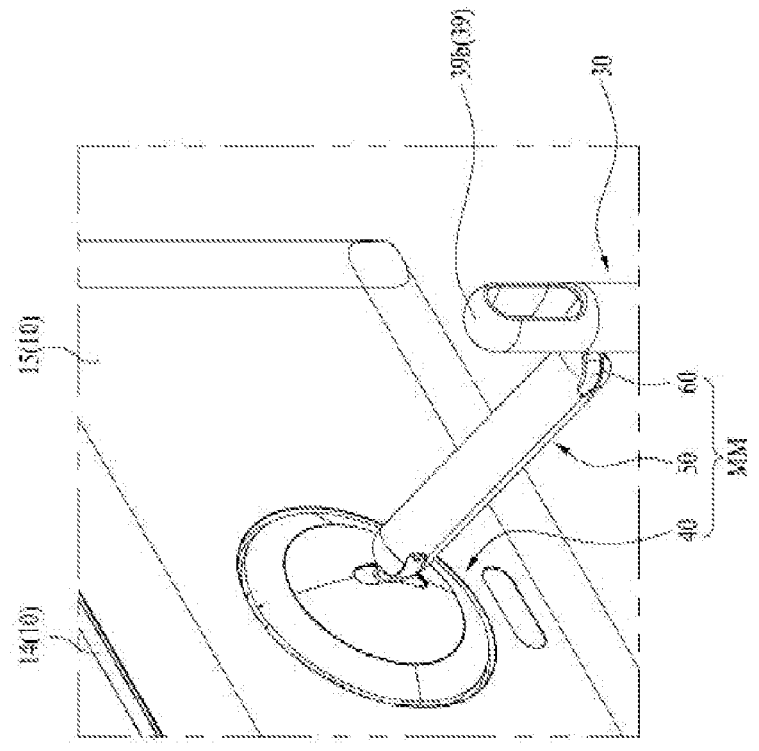
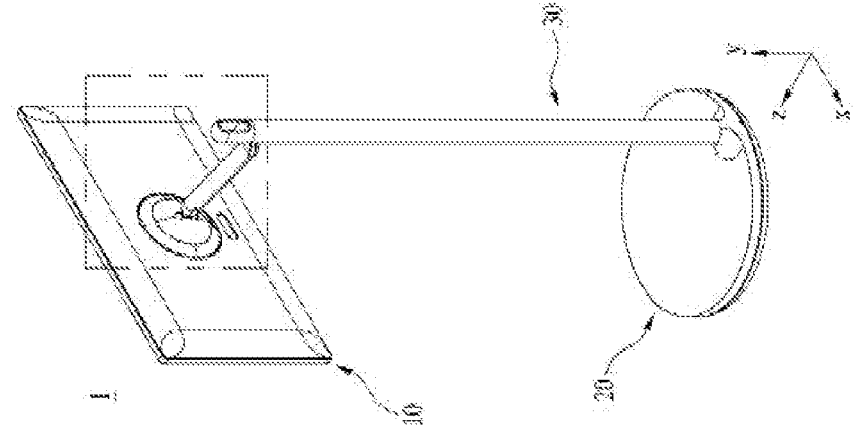

[Fig. 3]
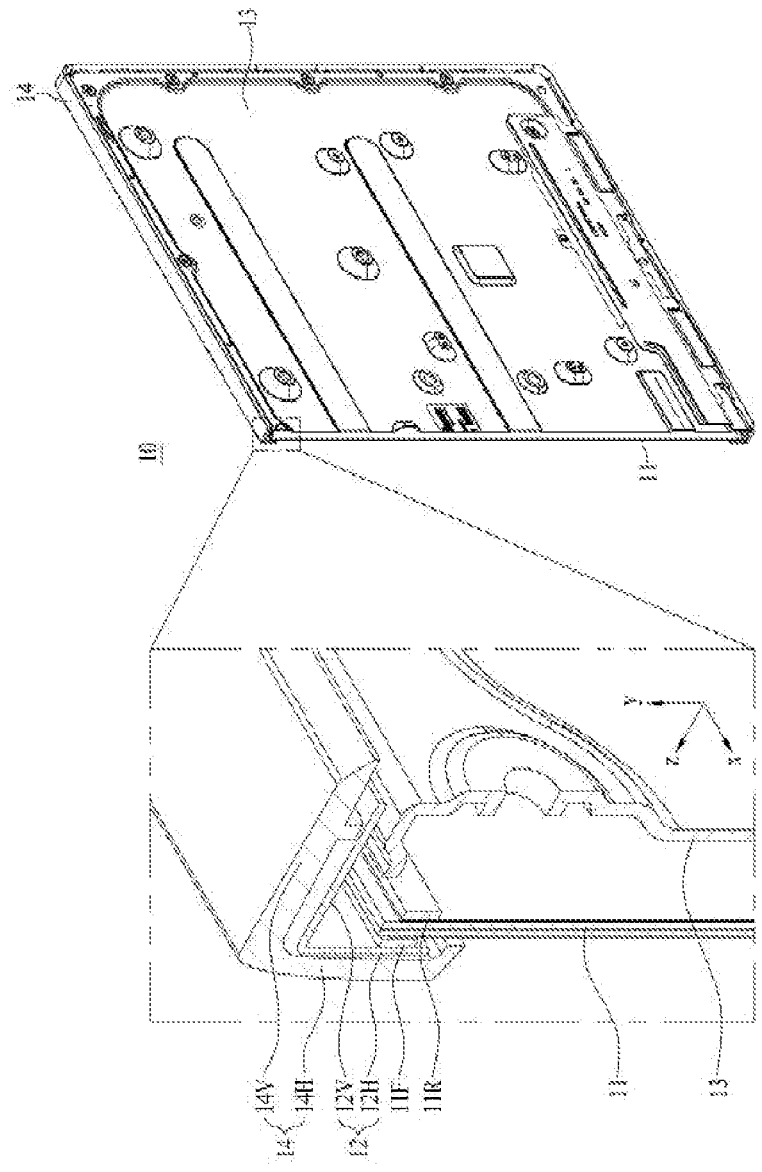

[Fig. 4]
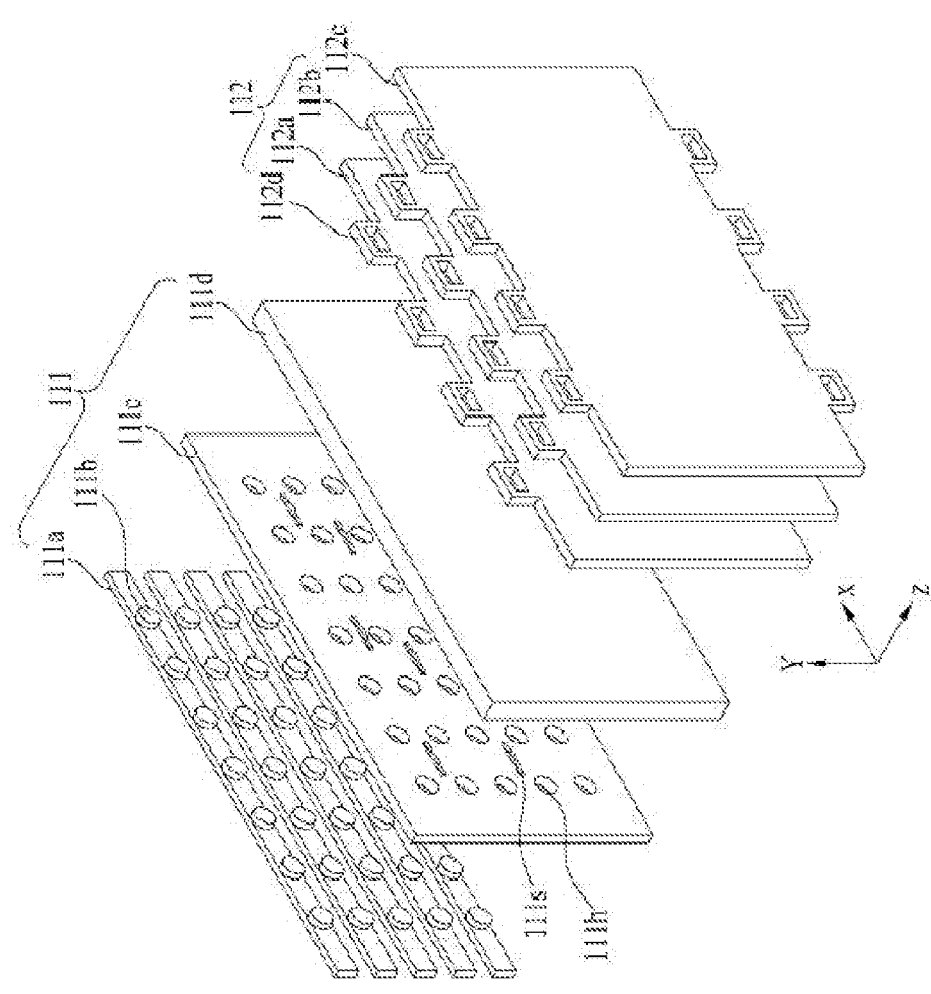

[Fig. 5]
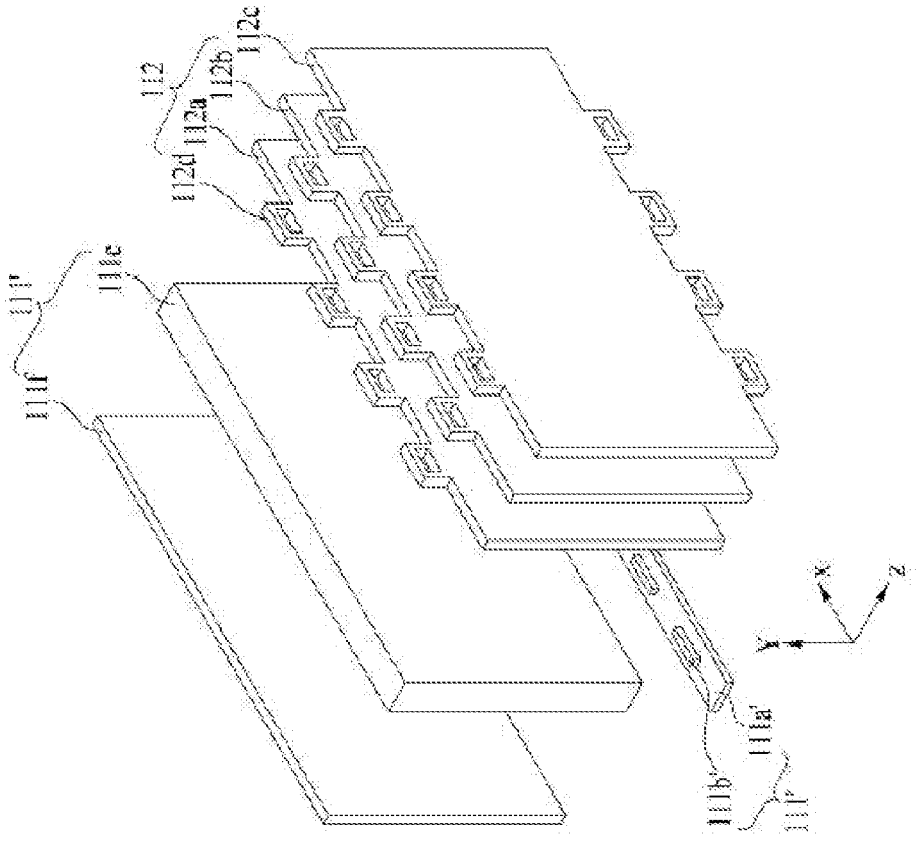

【Fig. 6】
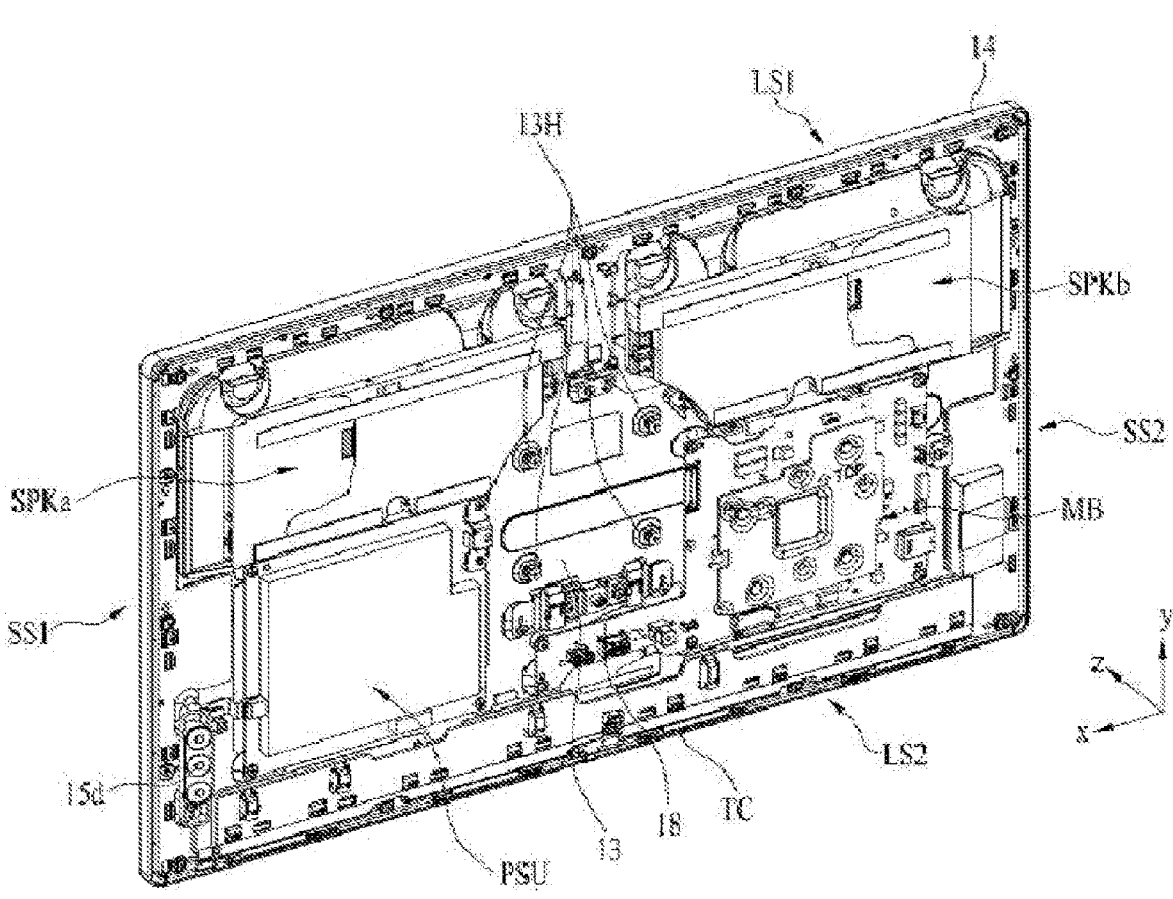

【Fig. 7】
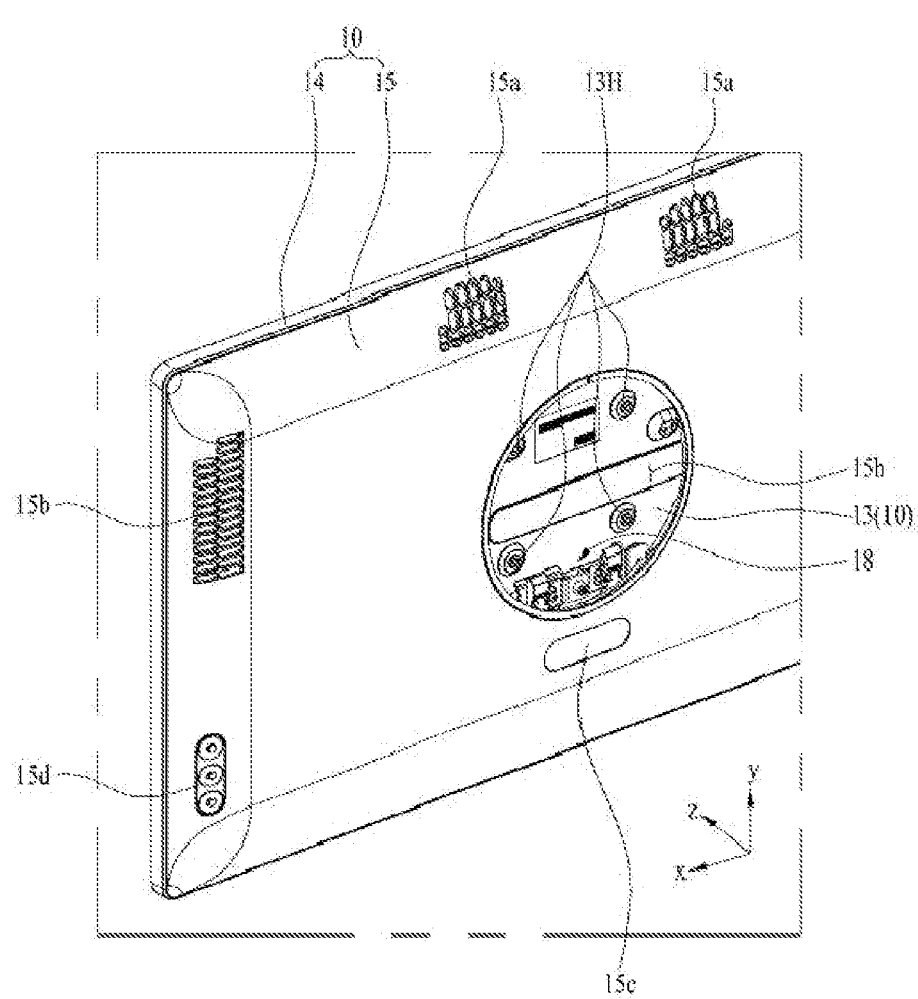

【Fig. 8】
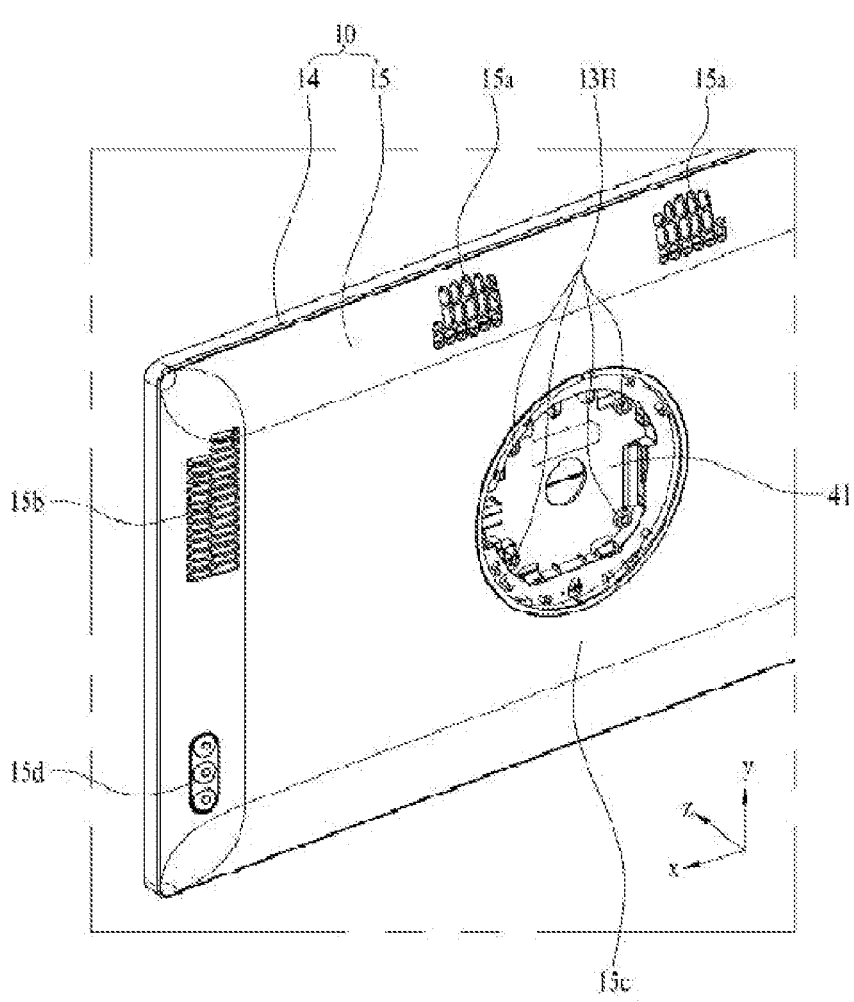

【Fig. 9】
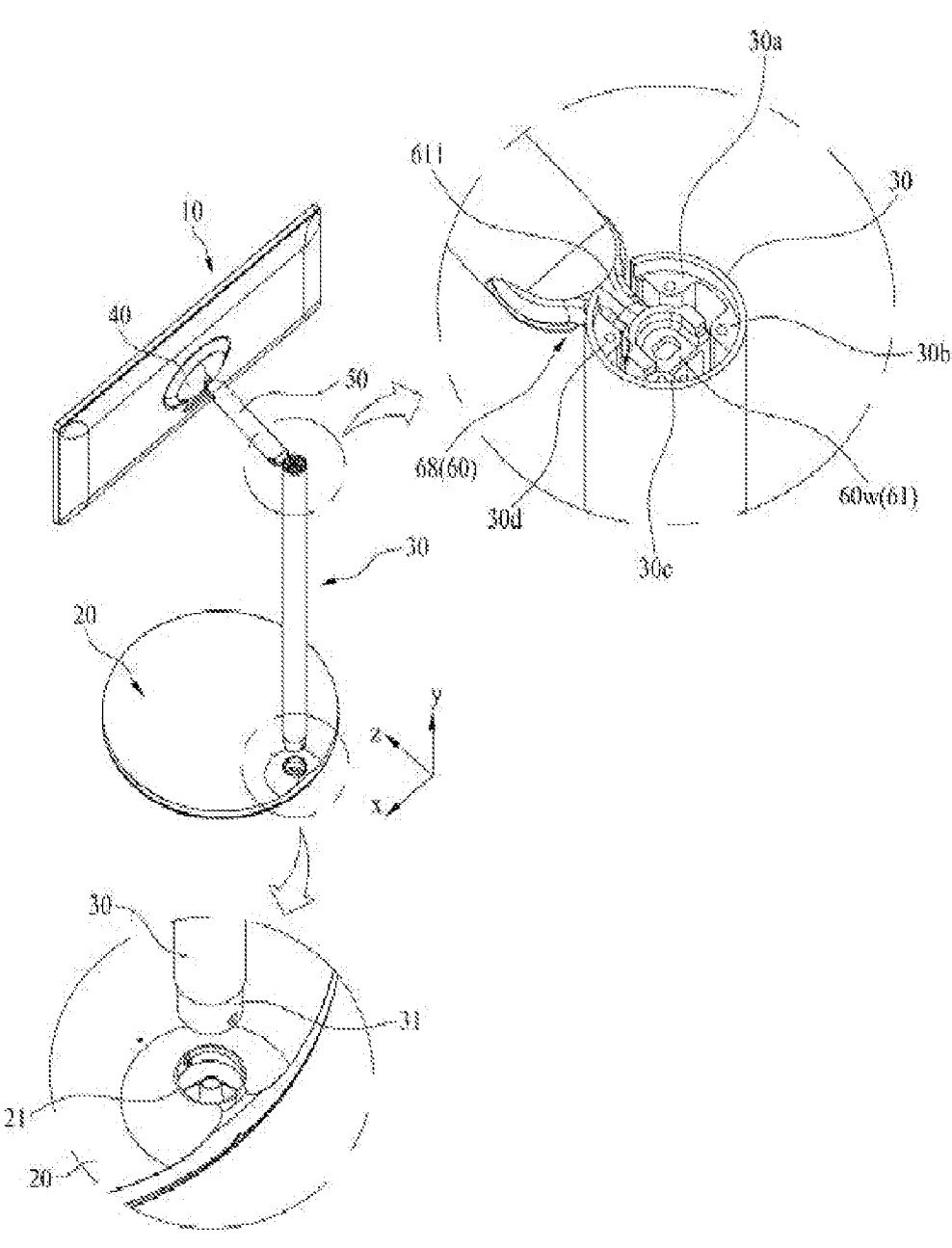

[Fig. 10]
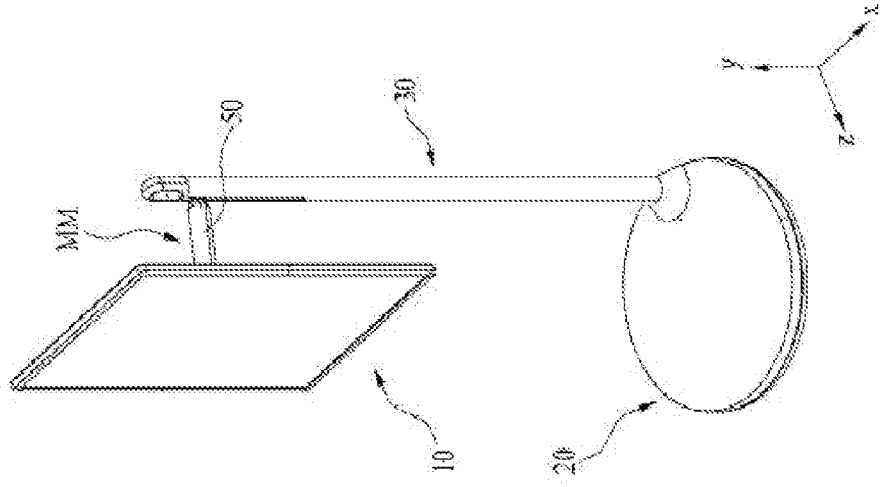
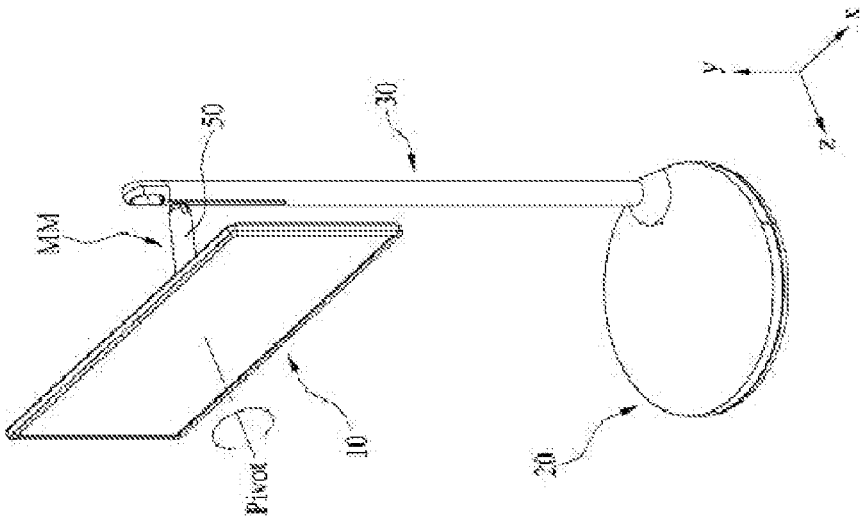

【Fig. 11】
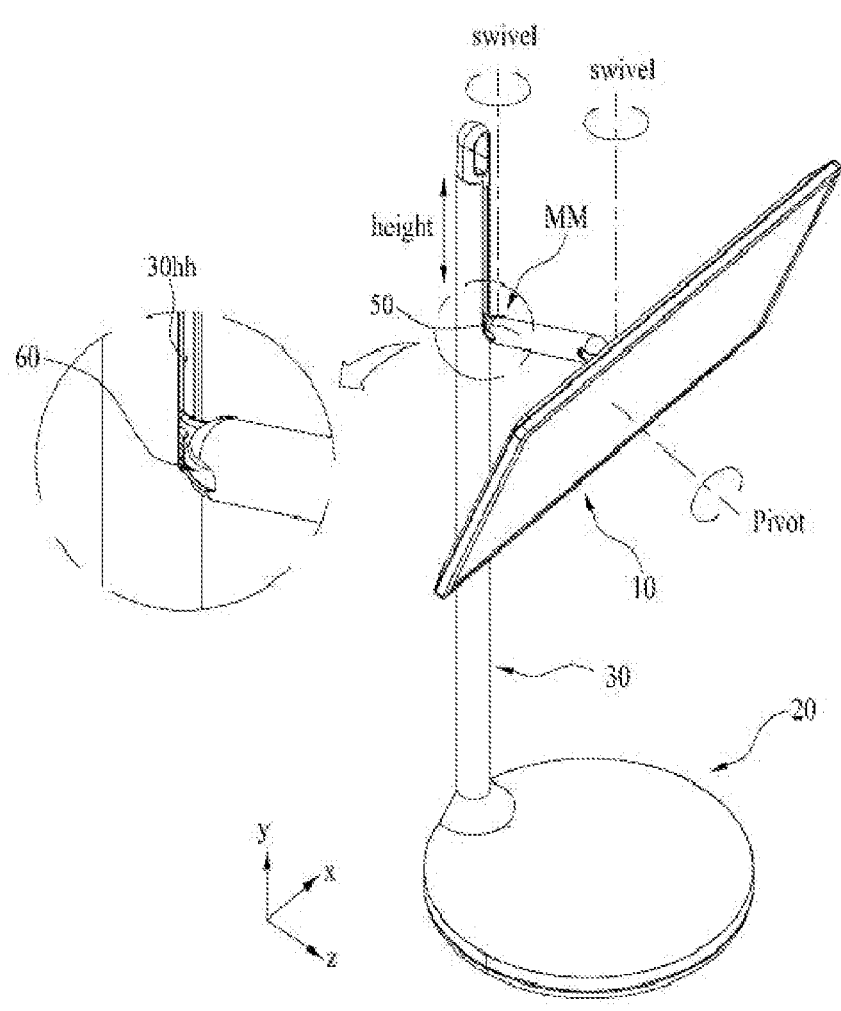

【Fig. 12】
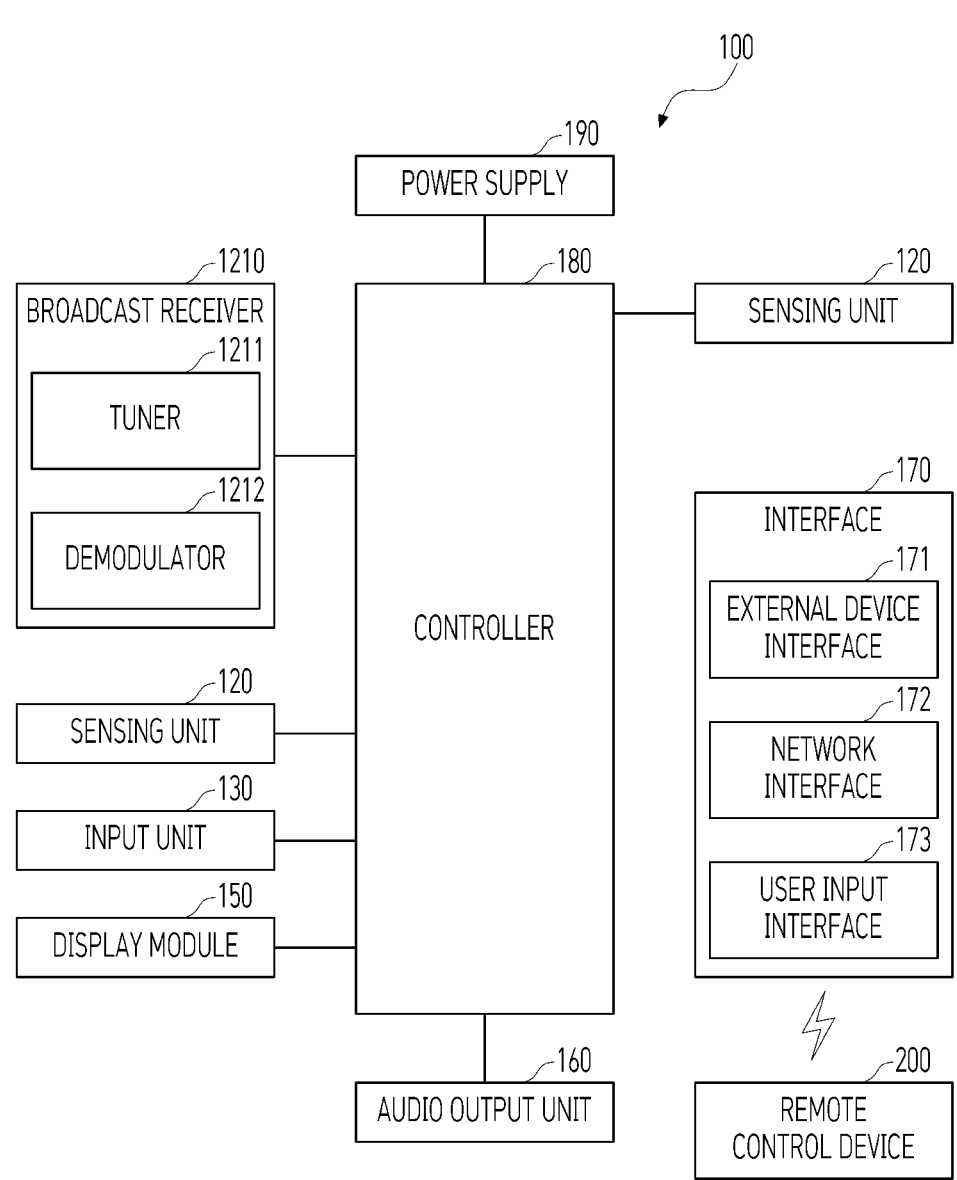

【Fig. 13】
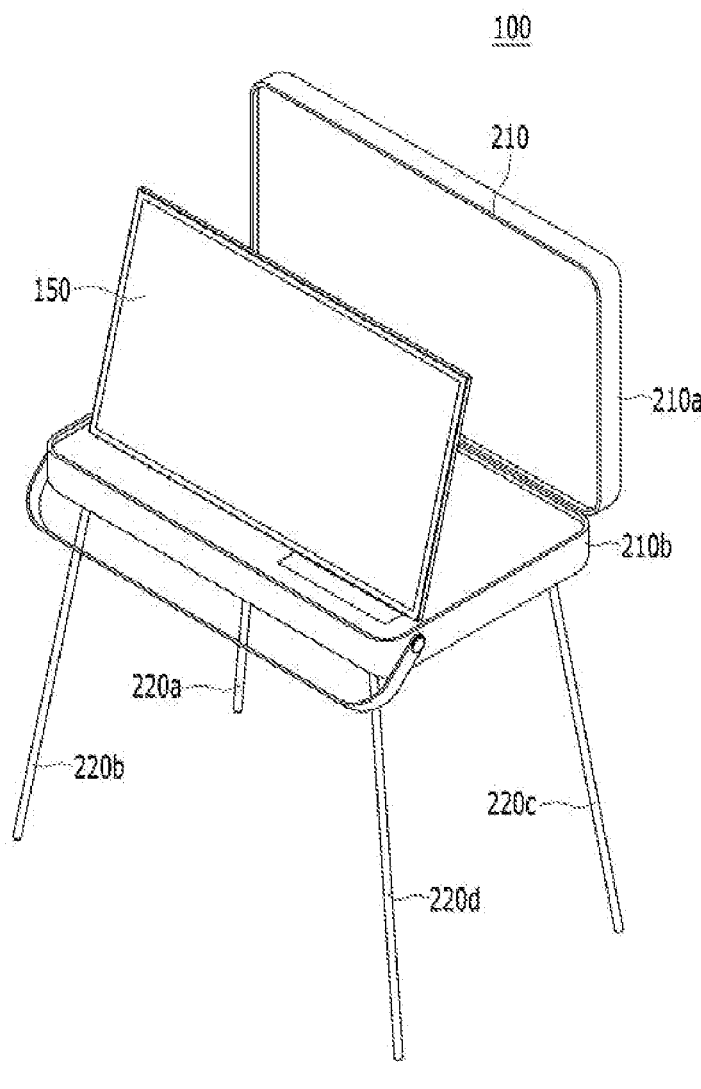

【Fig. 14】
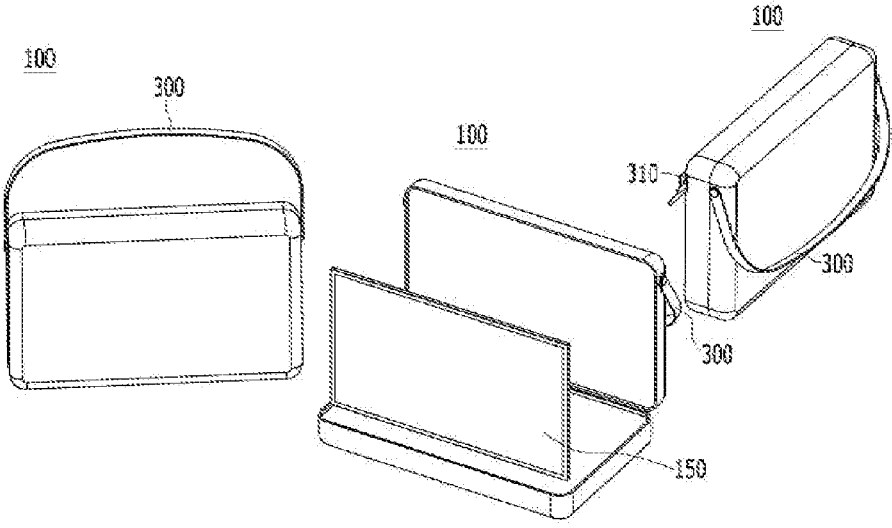

【Fig. 15】
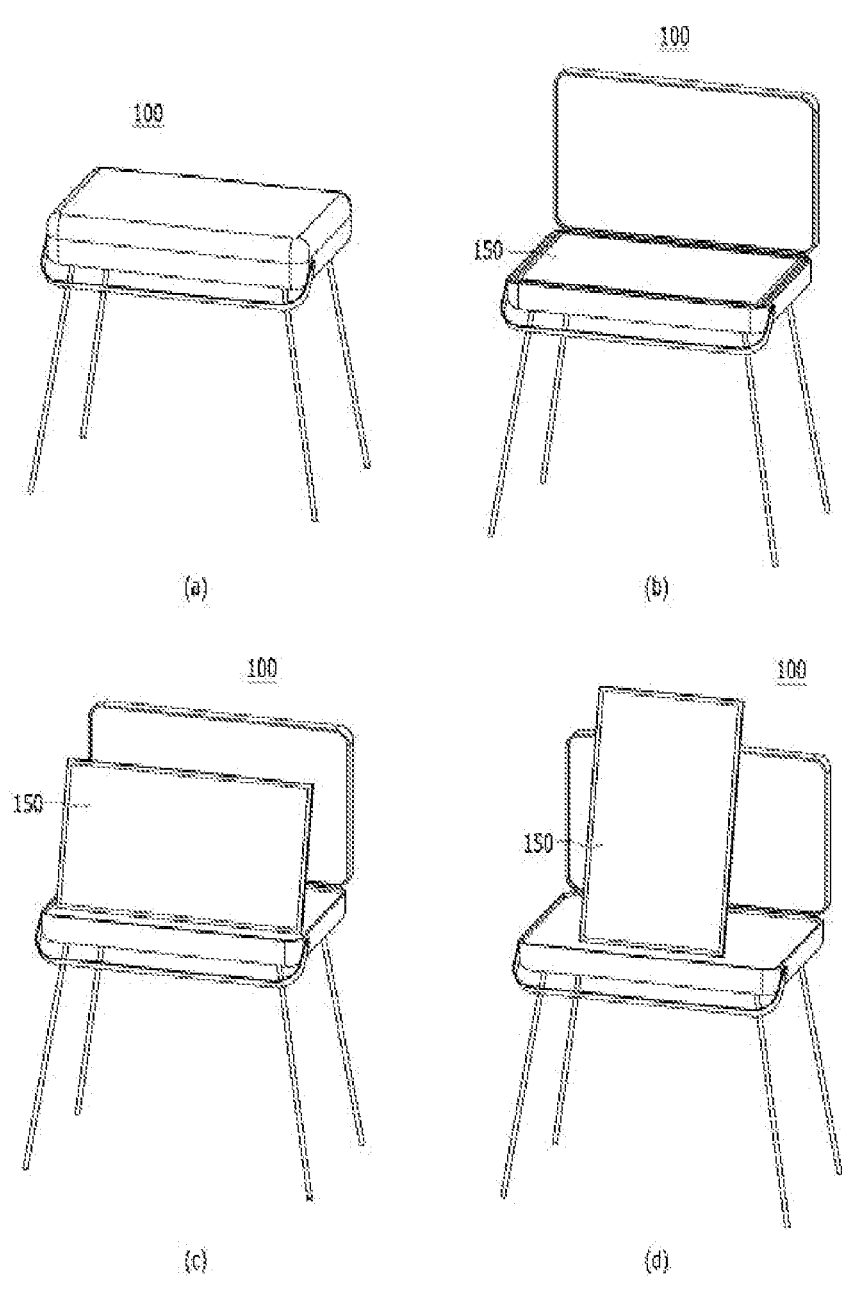
(a)
(b)
(c)
(d)

【Fig. 16】
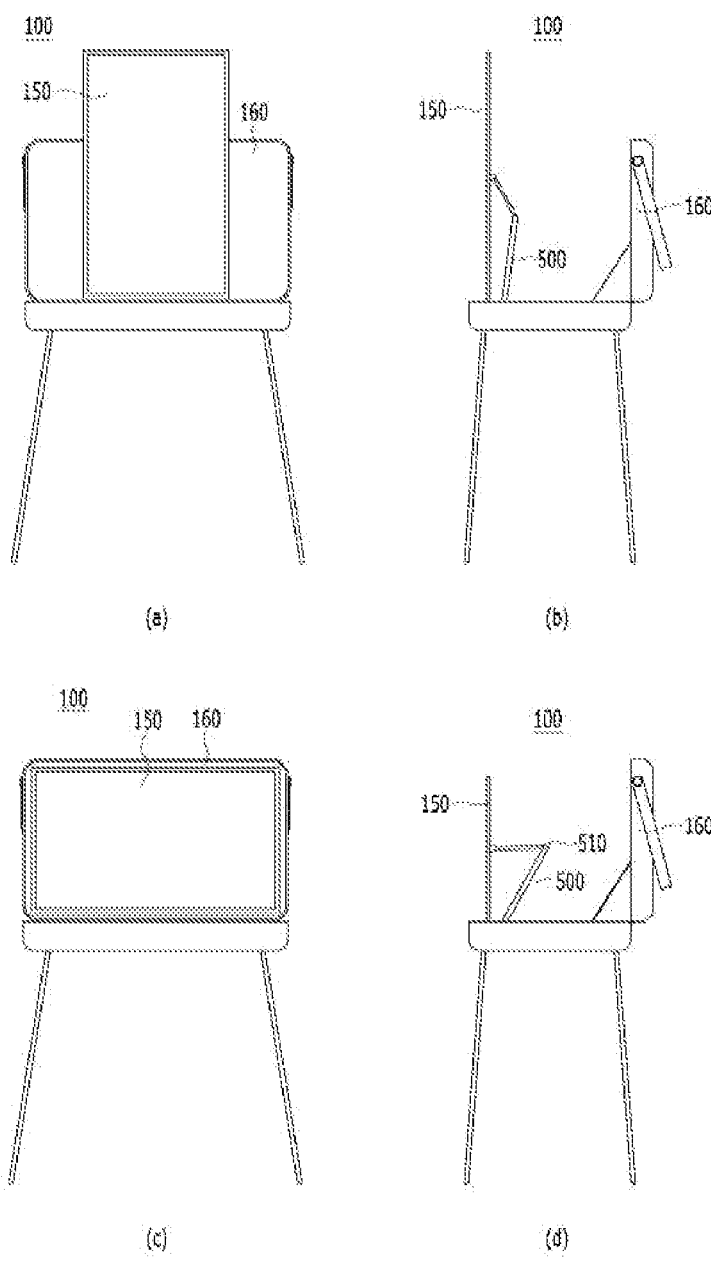

【Fig. 17】
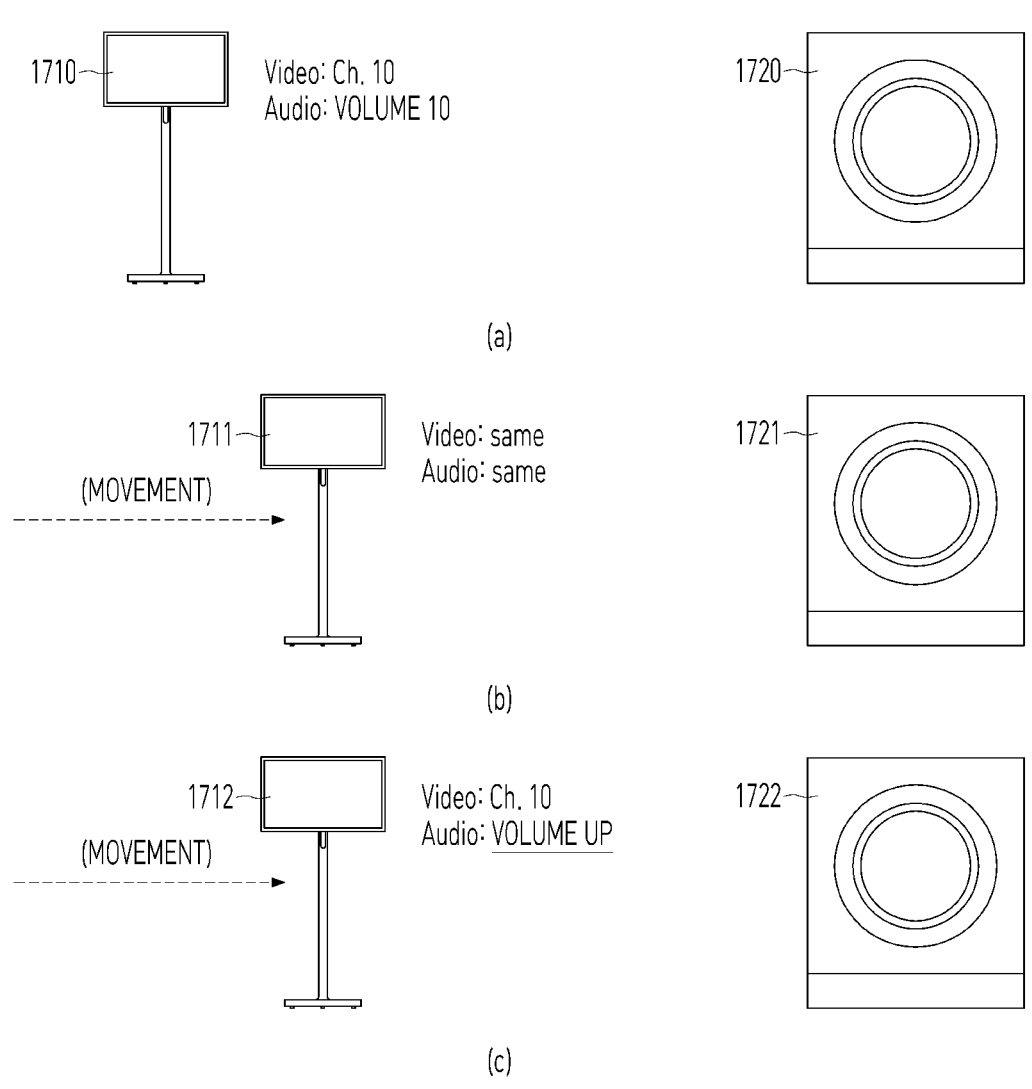
1710 — Video: Ch. 10
       Audio: VOLUME 10
1720 —
(a)
1711 — Video: same
       Audio: same
(MOVEMENT)
1721 —
(b)
1712 — Video: Ch. 10
       Audio: VOLUME UP
(MOVEMENT)
1722 —
(c)

[Fig. 18]
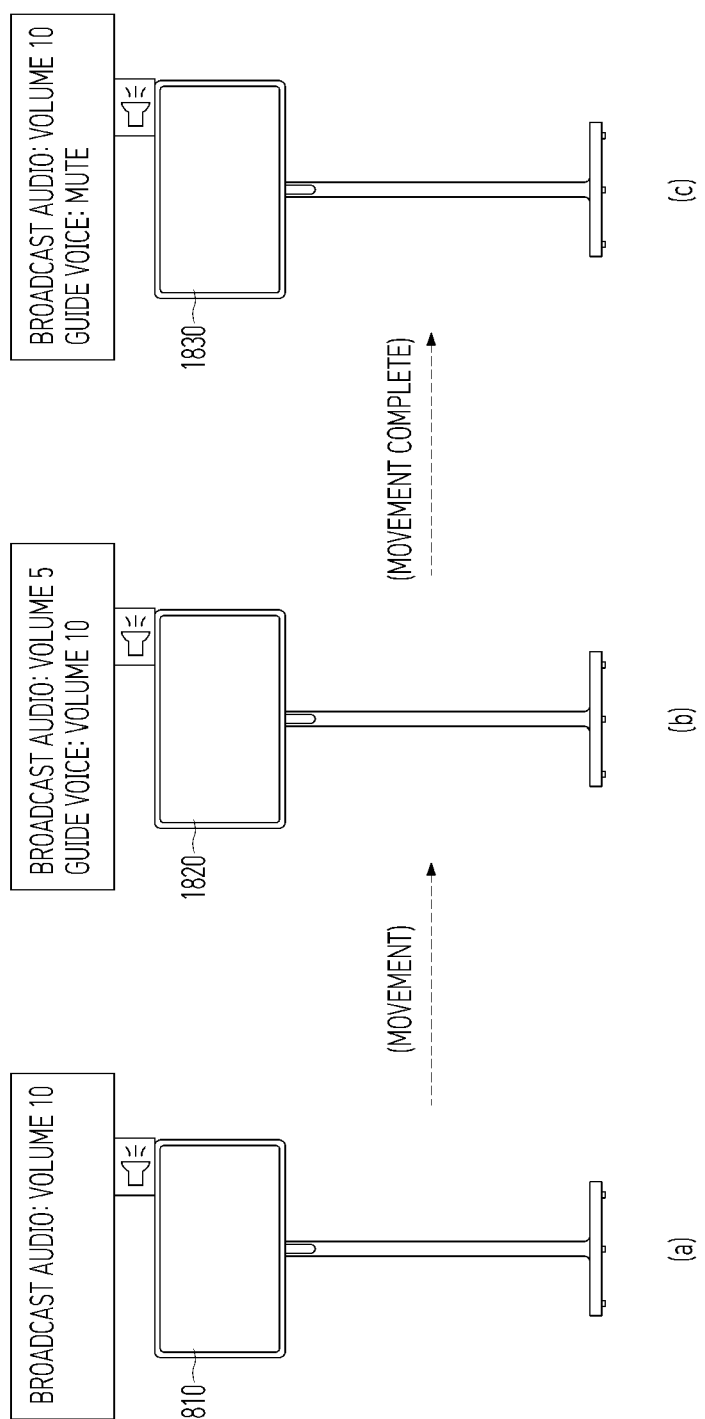

【Fig. 19】
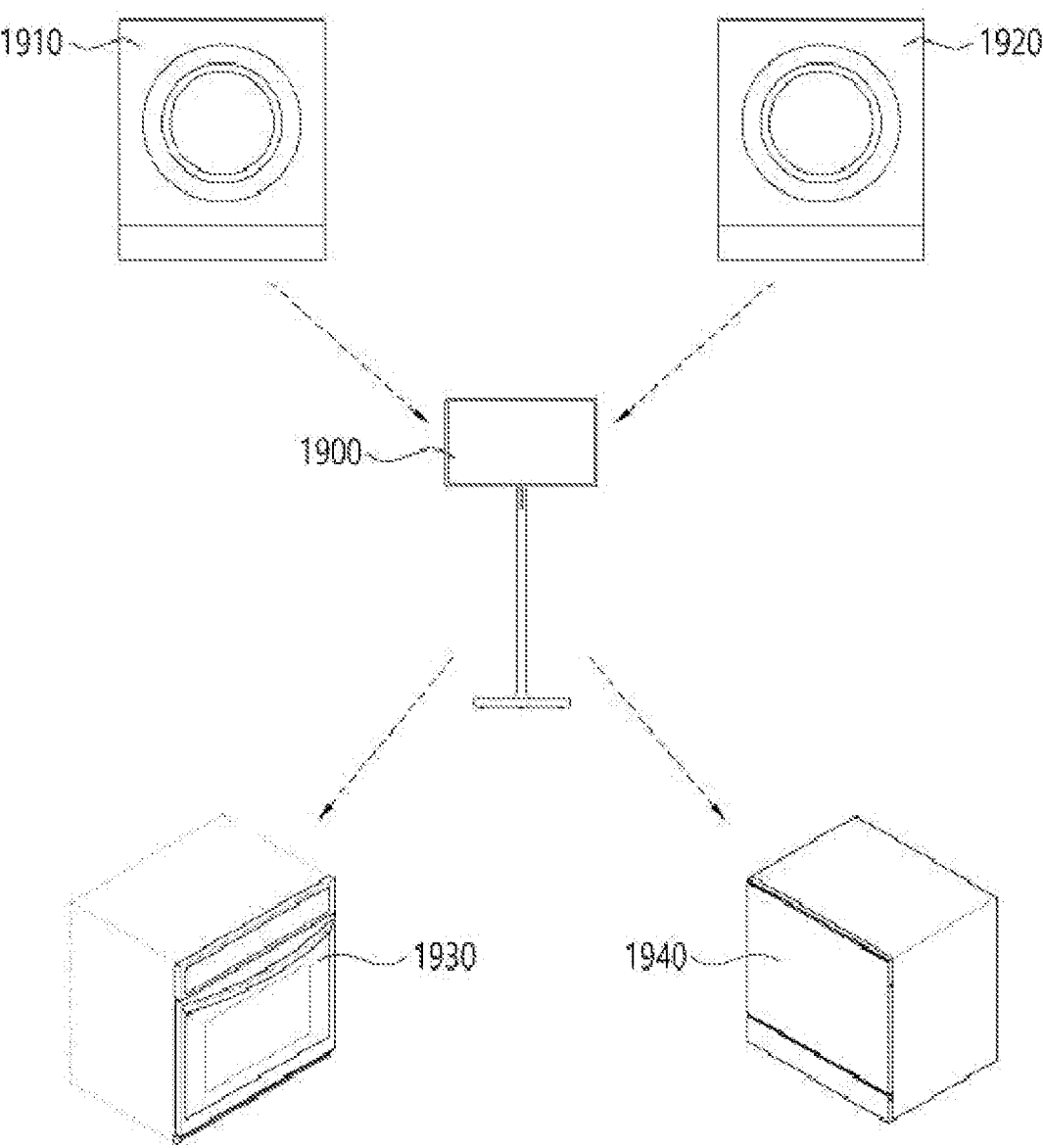

【Fig. 20】
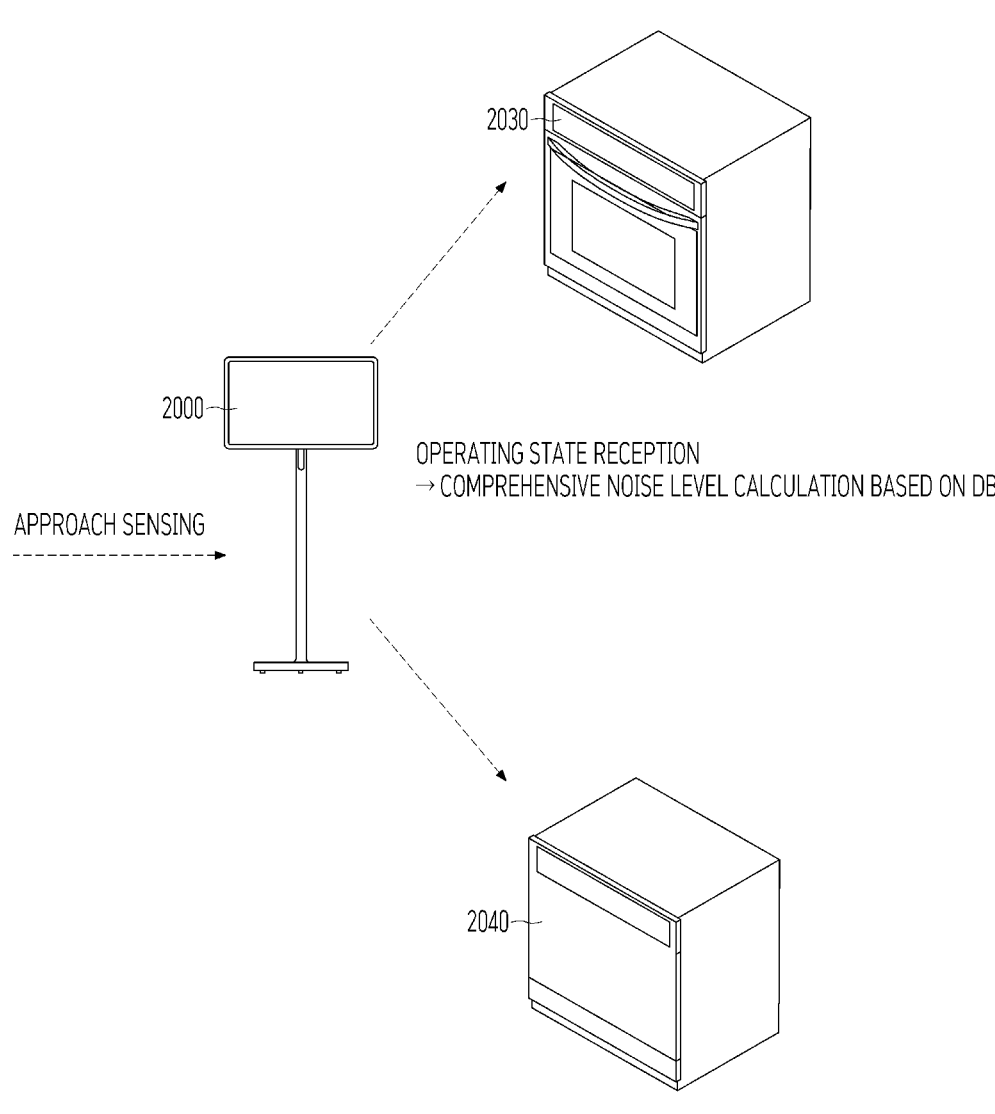

【Fig. 21】
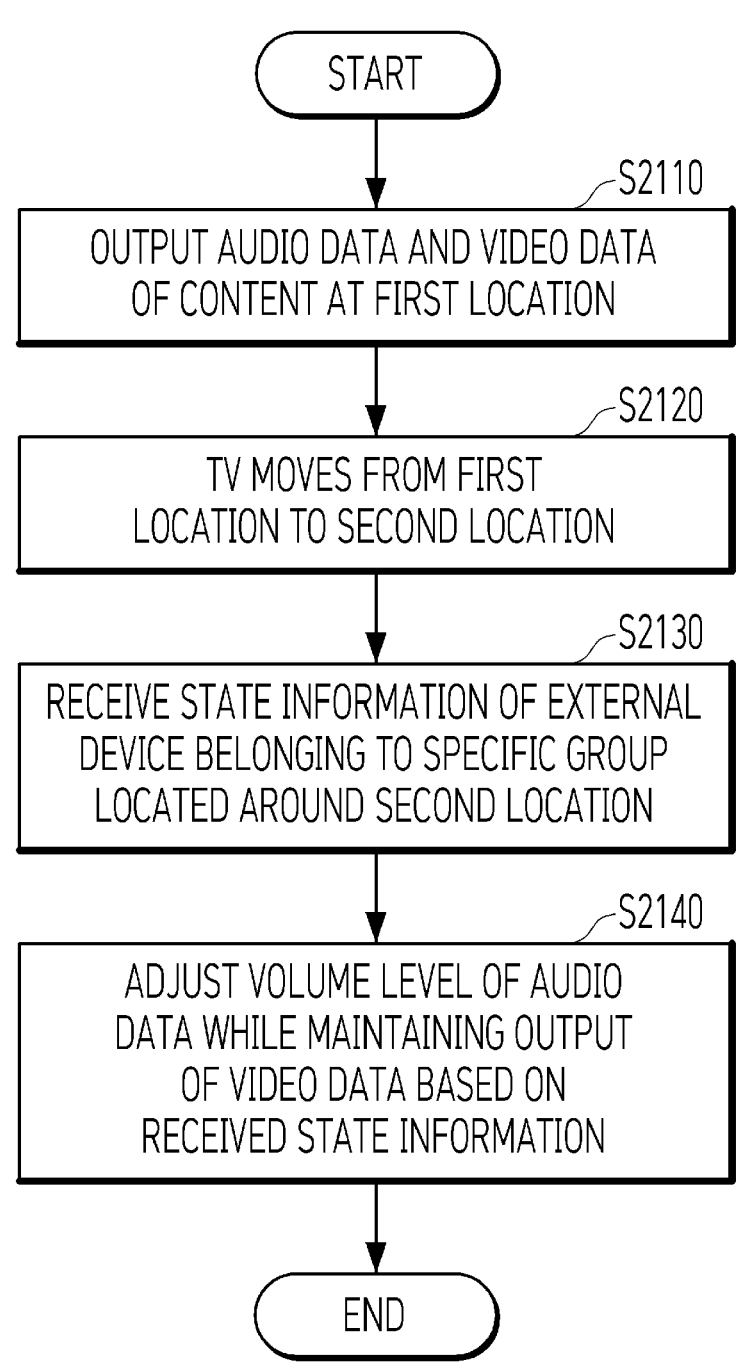

【Fig. 22】
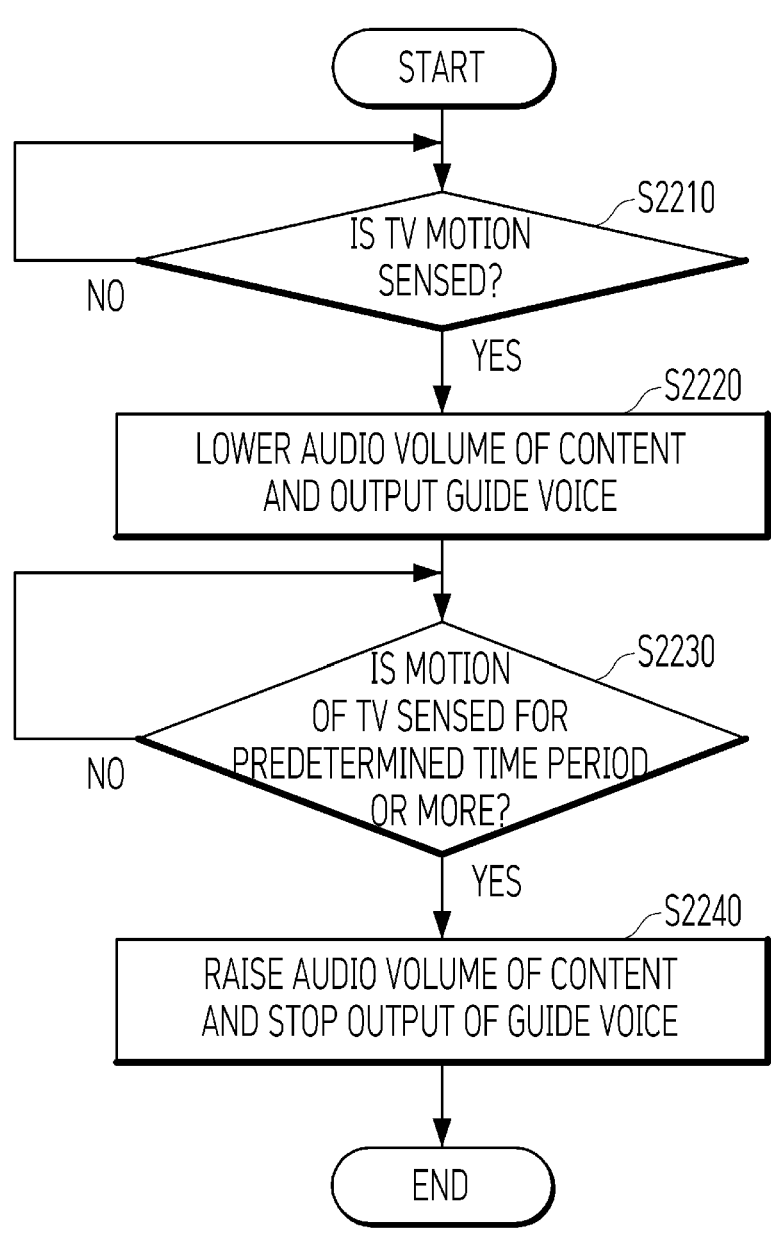

【Fig. 23】
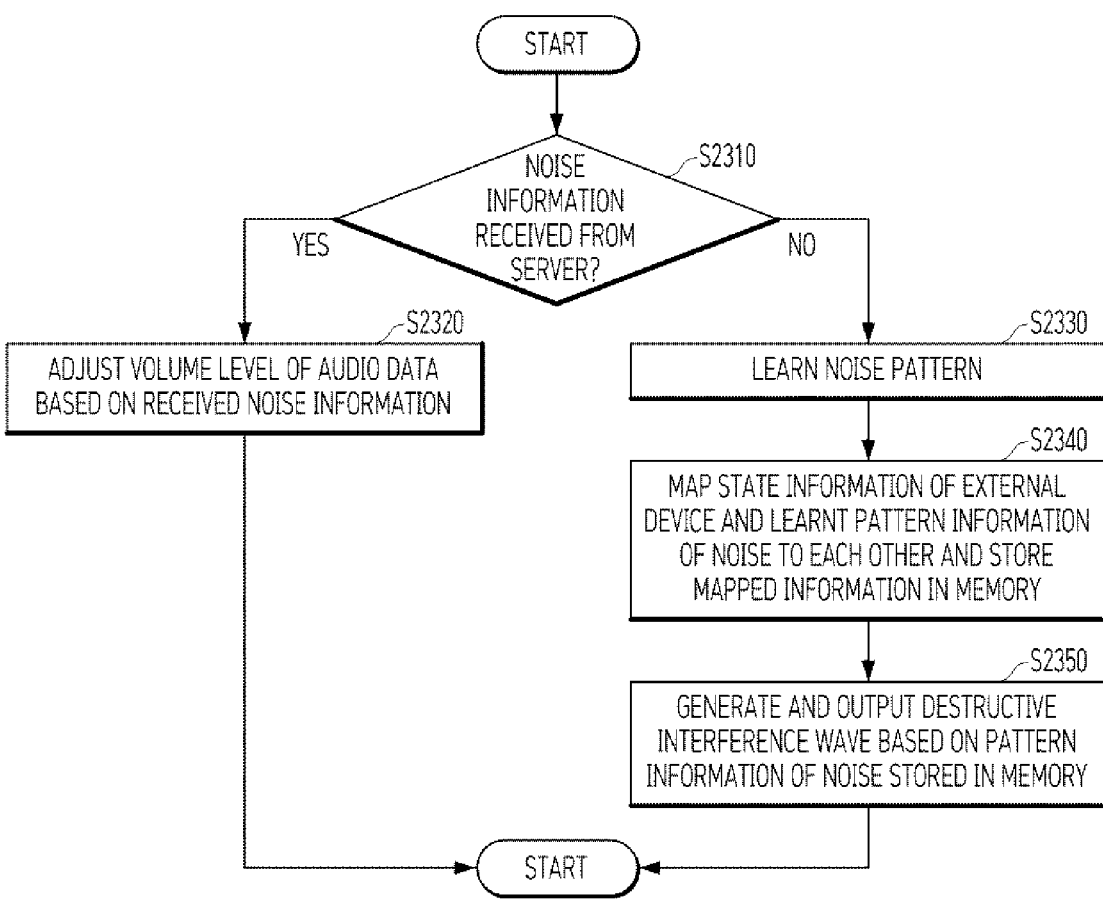

MOVABLE TV AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2022-0102020, filed on Aug. 16, 2022, the contents of which are hereby incorporated by reference herein in its entirety.

BACKGROUND

Field

The present disclosure relates to a multimedia device, and more particularly, is a technology related to a television (TV) movable via connection with various moving members, for example.

Discussion of the Related Art

Recently, in multimedia devices such as a mobile phone and a TV, a new form-factor is being discussed. The form-factor refers to a structured form of a product.

The reason why form-factor innovation is emerging as important in a display industry is because of increasing needs of a user for the form-factor that may be used freely and conveniently regardless of a use situation departing from a typical form-factor customized for a specific use environment in the past, resulted from an increase in consumer mobility, convergence between devices, a rapid progress in smartization, and the like.

For example, vertical TVs are expanding, breaking the stereotype that the TVs are viewed horizontally. The vertical TV is a product that allows the user to change a direction of a screen by reflecting characteristics of the Millennials and Gen Z who are accustomed to enjoying content on mobile. The vertical TVs are convenient because a social media or a shopping site image may be viewed easily and comments may be read while watching videos at the same time. In particular, the advantages of the vertical TV are magnified more when the vertical TV is in association with a smartphone via a near-field communication (NFC)-based mirroring function. When watching regular TV programs or movies, the TV may be switched horizontally.

As another example, a rollable TV and a foldable smartphone are similar to each other in that they both use 'flexible displays'. The flexible display literally means a flexible electronic device. To be flexible, the flexible display must first be thin. A substrate that receives information and converts the same into light must be thin and flexible so that a performance lasts for a long time without damage.

Being flexible means that the flexible display should not be greatly affected even when an impact is applied thereto. While the flexible display is bent or folded, a pressure is continuously applied to a junction. It is necessary to have excellent durability such that the inside is not damaged by such pressure, but also have a property of being easily deformed when the pressure is applied.

The flexible display is implemented based on an OLED, for example. The OLED is a display using an organic light emitting material, the organic material is relatively more flexible than an inorganic material such as a metal. Furthermore, the OLED has a thin substrate and thus is more competitive than other displays. In a case of an LCD substrate used in the past, there is a limit to reducing a thickness because liquid crystal and glass are required separately.

Finally, as a new form-factor for the TV, a demand for a TV that may be easily moved indoors and outdoors is increasing. In particular, because of the recent corona virus epidemic, the time the users stay at home is increasing, and thus, a demand for a second TV is increasing. In addition, because of an increase in population going out for camping or the like, there is a demand for the TV of the new form-factor that may be easily carried and moved.

SUMMARY

One embodiment of the present disclosure is to present a TV having a new form-factor.

Another embodiment of the present disclosure is to provide a TV that is easily movable indoors and outdoors.

Another embodiment of the present disclosure is to propose a system that may adaptively change an audio volume based on a noise of a peripheral device because of characteristics of a movable TV.

A method for controlling a movable TV according to an embodiment of the present disclosure includes outputting audio data and video data of content at a first location, moving the TV from the first location to a second location, receiving state information of an external device belonging to a specific group located around the second location, and adjusting a volume level of the audio data while maintaining the output of the video data based on the received state information.

The method may further include lowering the volume level of the audio data of the content and outputting a guide voice notifying that the TV is moving when the motion of the TV is sensed. The volume level of the audio data of the content may be at least two times smaller than a volume level of the guide voice.

The method may further include controlling to raise the volume level of the audio data of the content and to stop outputting the guide voice notifying that the TV is moving when the motion of the TV is not sensed for a predetermined time period or more.

The external device belonging to the specific group may include, for example, at least one external device having a speaker or at least one external device generating noise resulted from vibration, regardless of whether the speaker is included.

When noise information based on the state information of the external device belonging to the specific group is received from a server, the volume level of the audio data may be adjusted based on the noise information.

The method may further include learning a pattern of noise generated by the external device when the noise information based on the state information of the external device belonging to the specific group is not received from the server. Moreover, the method may further include mapping the state information of the external device and learnt pattern information of the noise to each other and storing the mapped information in a memory. In addition, the method may further include generating and outputting a destructive interference wave based on the pattern information of the noise stored in the memory.

A movable TV according to another embodiment of the present disclosure includes a tuner that receives a broadcast signal, a speaker that outputs audio data of content contained in the broadcast signal at a first location, a display that outputs video data of the content contained in the broadcast signal at the first location, a moving member that moves the TV from the first location to a second location, a network interface that receives state information of an external device belonging to a specific group located around the second location, and a controller that adjusts a volume level of the audio data while maintaining the output of the video data based on the received state information.

According to an embodiment of the present disclosure, the TV having the new form-factor is presented.

According to another embodiment of the present disclosure, the TV that is easily movable indoors and outdoors is provided.

In addition, according to another embodiment of the present disclosure, the technical effect of adaptively changing the audio volume based on the noise of the peripheral device because of the characteristics of the movable TV is expected.

A further scope of applicability of the present disclosure will become apparent from the detailed description below.

However, because various changes and modifications within the spirit and the scope of the present disclosure may be clearly understood by those skilled in the art, the detailed description and specific embodiments such as preferred embodiments of the present disclosure should be understood as given only as examples.

BRIEF DESCRIPTION OF THE DRAWINGS

FIGS. 1 to 11 are diagrams for illustrating a display device according to an embodiment of the present disclosure.

FIG. 12 is a block diagram for illustrating each component of a display device according to an embodiment of the present disclosure.

FIG. 13 is a diagram showing a display device according to an embodiment of the present disclosure.

FIG. 14 is a diagram showing an example of utilization of a display device according to an embodiment of the present disclosure.

FIG. 15 is another diagram showing an example of utilization of a display device according to an embodiment of the present disclosure.

FIG. 16 is a diagram showing front and side surfaces of a display device according to an embodiment of the present disclosure.

FIG. 17 is a diagram for illustrating a process of adjusting a volume of audio data when a movable TV according to an embodiment of the present disclosure is located near a specific external device.

FIG. 18 is a diagram for illustrating a process of adjusting a volume of audio data while a movable TV according to an embodiment of the present disclosure moves.

FIG. 19 is a diagram for illustrating a process in which a movable TV according to an embodiment of the present disclosure receives noise information of an external device.

FIG. 20 is a diagram for illustrating a process in which a movable TV according to an embodiment of the present disclosure learns a noise level of an external device.

FIG. 21 is a flowchart illustrating a method for controlling a movable TV according to an embodiment of the present disclosure.

FIG. 22 is a flowchart showing another process for realizing S2120 shown in FIG. 21.

In addition, FIG. 23 is a flowchart showing another process of realizing S2130 shown in FIG. 21.

DESCRIPTION OF SPECIFIC EMBODIMENTS

Hereinafter, the embodiments disclosed herein will be described in detail with reference to the accompanying drawings, but components that are the same as or similar to each other regardless of reference numerals will be given the same reference numerals, and redundant description thereof will be omitted. The suffixes "module" and "unit" for components used in the following description are given or used together in consideration of ease of writing the present document, and do not have meanings or roles that are distinct from each other by themselves. Further, in describing the embodiments disclosed herein, when it is determined that a detailed description of related known technologies may unnecessarily obscure the gist of the embodiments disclosed herein, detailed description thereof will be omitted. In addition, the attached drawings are provided for easy understanding of the embodiments disclosed herein and do not limit technical idea disclosed herein, and should be construed as including all modifications, equivalents, and alternatives falling within the spirit and scope of the present disclosure.

Although terms including ordinal numbers, such as first, second, and the like, may be used to describe various components, the components are not be limited by the terms. The terms are only used to distinguish one component from another.

It should be understood that when a component is referred to as being "connected with" another component, the component may be directly connected with another component or an intervening component may also be present. In contrast, it should be understood that when a component is referred to as being "directly connected with" another component, there is no intervening component present.

A singular representation may include a plural representation unless it represents a definitely different meaning from the context.

The terms "includes" or "has" used herein should be understood as not precluding possibility of existence or addition of one or more other characteristics, figures, steps, operations, constituents, components, or combinations thereof.

Direction indications of up U, down D, left Le, right Ri, front F, and rear R shown in the drawings are only for convenience of description, and thus, the technical idea disclosed herein is not limited.

FIGS. 1 to 11 are diagrams for illustrating a display device according to an embodiment of the present disclosure.

Referring to FIG. 1, a display device 1 may include a head 10. The head 10 may display an image. The head 10 may be referred to as a display 10 or a display unit 10.

The head 10 may include a first long side LS1, a second long side LS2 opposite to the first long side LS1, a first short side SS1 adjacent to the first long side LS1 and the second long side LS2, and a second short side SS2 opposite to the first short side SS1. Although it is shown and described that a length of the first and second long sides LS1 and LS2 is greater than a length of the first and second short sides SS1 and SS2 for convenience of illustration, the length of the first and second long sides LS1 and LS2 may be approximately equal to the length of the first and second short sides SS1 and SS2.

A direction parallel to the short sides SS1 and SS2 of the head 10 may be referred to as a first direction DR1 or a vertical direction. A direction parallel to the long sides LS1 and LS2 of the head 10 may be referred to as a second direction DR2 or a left and right direction. A direction perpendicular to the long sides LS1 and LS2 and the short sides SS1 and SS2 of the head 10 may be referred to as a third direction DR3 or a front and rear direction.

A side on which the head 10 displays the image may be referred to as the front side F and z, and a side opposite thereto may be referred to as the rear side R. A side of the first short side SS1 may be referred to as the left side Le and x. A side of the second short side SS2 may be referred to as the right side Ri. A side of the first long side LS1 may be referred to as the upper side U and y. A side of the second long side LS2 may be referred to as the lower side D.

The first long side LS1, the second long side LS2, the first short side SS1, and the second short side SS2 may be referred to as edges of the head 10. In addition, a point where two of the first long side LS1, the second long side LS2, the first short side SS1, and the second short side SS2 meet each other may be referred to as a corner.

A point where the first short side SS1 and the first long side LS1 meet each other may be a first corner C1. A point where the first short side SS1 and the second long side LS2 meet may be a second corner C2.

A point where the second short side SS2 and the second long side LS2 meet each other may be a third corner C3. A point where the second short side SS2 and the first long side LS1 meet each other may be a fourth corner C4.

Referring to FIGS. 1 and 2, the display device 1 may include a base 20, a pole 30, and a motion module MM.

The base 20 may have a flat cylinder shape as a whole. The base 20 may be disposed on the ground.

The pole 30 may extend long in the vertical direction. A lower end of the pole 30 may be coupled onto the base 20. The pole 30 may be adjacent to a circumference of a top surface of the base 20. A handle 39 may be coupled to an upper end of the pole 30. The pole 30 and the aforementioned base 20 may be collectively referred to as a stand.

The motion module MM may extend in a direction intersecting the pole 30. One side of the motion module MM may be coupled to a rear side of the head 10. The other side of the motion module MM may be adjacent to the upper end of the pole 30 and may be coupled to the pole 30. An articulating connector 40 may be coupled to the rear side of the head 10, an elevating module 60 may be coupled to the pole 30, and an arm 50 may connect the articulating connector 40 and the elevating module 60 to each other.

Accordingly, the head 10 may be supported by the motion module MM, the pole 30, and the base 20, and may be spaced upward from the ground.

Referring to FIGS. 2 and 3, the head 10 may include a display panel 11, a middle cabinet 12, a frame 13, an end frame 14, and a back cover 15.

The display panel 11 may form a front surface of the head 10. For example, the display panel 11 may be an OLED panel, an LCD panel, or an LED panel. The display panel 11 may output the image by dividing the image into a plurality of pixels and matching color, brightness, and saturation for each pixel. The display panel 11 may be divided into an active area in which the image is displayed and an inactive area in which the image is not displayed. The display panel 11 may generate light with a color corresponding to red, green, or blue in response to a control signal.

The middle cabinet 12 may extend along a perimeter of the display panel 11. A horizontal portion 12H may be located in front of the display panel 11. A vertical portion 12V may intersect the horizontal portion 12H and may cover a side surface of the display panel 11.

For example, the middle cabinet 12 may contain a metal or plastic material. The middle cabinet 12 may be referred to as a side frame or a guide panel.

The frame 13 may be positioned at the rear of the display panel 11. Electronic components such as a printed circuit board (PCB) may be coupled to a rear surface of the frame 13. For example, the frame 13 may contain a metal material. The frame 13 may be referred to as a mount plate or a module cover.

The end frame 14 may form a perimeter of the head 10. A horizontal portion 14H may be located in front of the horizontal portion 12V of the middle cabinet 12. A vertical portion 14V may cover a side surface of the vertical portion 12V of the middle cabinet 12. For example, the end frame 14 may contain a metal or plastic material.

The back cover 15 may form a rear surface of the head 10. The back cover 15 may cover the frame 13 from the rear and may be coupled to the frame 13.

Referring to FIGS. 3 and 4, a backlight unit 110 may be positioned between the display panel 11 and the frame 13 and coupled to the frame 13. In this regard, the display panel 11 may be referred to as the LCD panel. The backlight unit 110 may include an optical layer 111 and an optical sheet 112. The optical layer 111 may include a substrate 111a, at least one light source 111b, a reflective sheet 111c, and a diffusion plate 111d.

The substrate 111a may be coupled to a front surface of the frame 13. The substrate 111a may have a plate shape or may be composed of a plurality of straps spaced apart from each other in the vertical direction. The at least one light source 111b may be mounted on the substrate 111a. For example, the light source 111b may include a light emitting diode (LED). An electrode pattern for connecting an adapter and the light source 111b to each other may be formed on the substrate 111a. The reflective sheet 111c may be positioned in front of the substrate 111a. The reflective sheet 111c may have a hole 111h in which the light source 111b is positioned. The diffusion plate 111d may be positioned in front of the reflective sheet 111c. A spacer 111s may support a rear surface of the diffusion plate 111d at a location between the reflective sheet 111c and the diffusion plate 111d.

The optical sheet 112 may be located in front of the diffusion plate 111d. A rear surface of the optical sheet 112 may be in close contact with the diffusion plate 111d, and a front surface of the optical sheet 112 may be in close contact with or adjacent to a rear surface of the display panel 11. The optical sheet 112 may include at least one of a diffusion sheet and a prism sheet. A coupling portion 112d may be formed at at least one edge of the optical sheet 112.

Accordingly, light from the light source 111b may be provided to the display panel 11 through the diffusion plate 111d and the optical sheet 112. In one example, the display panel 11 of the present disclosure may be the OLED panel that does not require the aforementioned backlight unit 110 or a different type of panel.

Referring to FIGS. 3 and 5, a backlight unit 110' may be located between the display panel 11 and the frame 13 and may be coupled to the frame 13. In this regard, the display panel 11 may be referred to as the LCD panel. The backlight unit 110' may include an optical layer 111' and the optical sheet 112. The optical layer 111' may include a substrate 111a', at least one light source 111b', a reflective sheet 111f, and a light guide plate 111e. The light guide plate 111e may be positioned between the frame 13 and the optical sheet 112 and may be supported by the frame 13.

The substrate 111a' may be adjacent to a perimeter of the light guide plate 111e and may be coupled to the frame 13. The at least one light source 111b' may be mounted on the substrate 111a'. For example, the light source 111b' may include a light emitting diode (LED). An electrode pattern for connecting an adapter and the light source 111b' to each other may be formed on the substrate 111a'. The reflective sheet 111*f* may be positioned between the frame 13 and the light guide plate 111*e* and may be supported by the frame 13.

Accordingly, light from the light source 111*b'* may be provided to the display panel 11 through the light guide plate 111*e* and the optical sheet 112. In one example, the display panel 11 of the present disclosure may be the OLED panel that does not require the aforementioned backlight unit 110' or another type of panel.

Referring to FIG. 6, the electronic components may be mounted on the rear surface of the frame 13 and may include a plurality of boards PSU, MB, and TC and speakers SPKa and SPKb.

The power supply board PSU may be located closer to the first short side SS1 than to the second short side SS2, and may be coupled to the rear surface of frame 13. The power supply board PSU may provide power to each component of the display device. For example, the power supply board PSU may provide the power to the light sources 111*b* and 111*b'* of the backlight units 110 and 110' (see FIGS. 4 and 5). The power supply board PSU may be referred to as an LED driver.

The main board MB may be located closer to the second short side SS2 than to the first short side SS1, and may be coupled to the rear surface of the frame 13. The main board MB may control the display device.

The timing controller board TC may be located downwardly of the power supply board PSU and the main board MB, and may be coupled to the rear surface of the frame 13. The timing controller board TC may be electrically connected to the display panel 11 (see FIG. 3) via a cable (not shown) and may provide an image signal to the display panel 11.

The speakers SPKa and SPKb may be located upwardly of the plurality of boards PSU, MB, and TC, and may be coupled to the rear surface of the frame 13. For example, the left speaker SPKa may be located closer to the first short side SS1 than to the second short side SS2, and may provide sound to the side. For example, the right speaker SPKb may be located closer to the second short side SS2 than to the first short side SS1, and may provide sound to the side.

A locking unit 18 may be coupled to the rear surface of the frame 13. The locking unit 18 may be located downwardly of a center of the frame 13.

Referring to FIG. 7, the back cover 15 may cover the frame 13 from the rear and may be coupled to the frame 13. Locations of speaker holes 15*a* and 15*b* defined in the back cover 15 may correspond to the locations of the speakers SPKa and SPKb (see FIG. 6) mounted on the frame 13.

A fixing member 13H may protrude rearwards from the rear surface of the frame 13. The fixing member 13H may be a fem nut. The fixing member 13H and the locking unit 18 may be exposed to the outside via a hole 15*h* defined at a center of the back cover 15.

Referring to FIGS. 7 and 8, a fixing plate 41 may have a circular plate shape corresponding to the hole 15*h* of the back cover 15.

A fixing hole 41H may be defined in the fixing plate 41 and may be aligned with the fixing member 13H. A fastening member (not shown) such as a screw may be fastened to the fixing member 13H via the fixing hole 41H. Accordingly, the fixing plate 41 may be coupled to the frame 13.

Referring to FIG. 9, the arm 50 may extend in a direction intersecting the head 10 and the pole 30. The arm 50 may connect the articulated connector 40 and the elevating module 60 to each other. A second pivoting unit 68 and a vertical member 61 of the elevating module 60 may be connected to each other via a second connector 611. The second connector 611 may pass through the pole 30.

The vertical portion member 61 may extend in a longitudinal direction of the pole 30. The vertical portion material 61 may be accommodated inside the pole 30.

The pole 30 may extend in the vertical direction and may surround the vertical material 61. A plurality of ribs 30*a*, 30*b*, 30*c*, and 30*d* may protrude toward the vertical material 61 from an inner circumferential surface of the pole 30, and may be spaced apart from each other in a circumferential direction of the pole 30. The first rib 30*a*, the second rib 30*b*, the third rib 30*c*, and the fourth rib 30*d* may be positioned at vertices of an arbitrary square inside the pole 30.

In addition, an inserted portion 31 of the pole 30 may be inserted into and coupled to a port 21 defined in a top surface of the base 20.

Referring to FIG. 10, the head 10 may be spaced upward from the base 20. A user may pivot the head 10. A pivot axis may pass through a center of head 10 and may be orthogonal to the head 10. Referring to a left drawing in FIG. 10, the head 10 may be placed in a landscape mode. Referring to a right drawing in FIG. 10, the head 10 may be placed in a portrait mode.

Referring to FIG. 11, the user may tilt the head 10. A tilt axis is located at the rear of the center of the head 10 and may be a horizontal axis parallel to the head 10. The user may swivel the head 10. A first swivel axis may be a vertical axis adjacent to one end of the arm 50. A second swivel axis may be a vertical axis adjacent to the other end of the arm 50. The user may ascend or descend the head 10 from the pole 30.

The aforementioned pivoting, tilting, swiveling, and elevating operations of the head 10 may be implemented independently of each other. For example, the head 10 may be pivoted within a range from +90 degrees to −90 degrees. For example, the head 10 may be tilted within a range from +25 degrees to −25 degrees. For example, the head 10 may be swiveled within a range from +65 to −65 degrees. For example, the head 10 may be located at a vertical level in a range from 1,065 to 1,265 mm from the base 20 or the ground in the landscape mode.

Referring to FIGS. 10 and 11, the base 20 may stably support various motions of the display device via the motion module MM. In addition, the base 20 may improve stability of moving of the display device via a wheel assembly 29 (see FIG. 34).

On the other hand, the display device described herein is, for example, an intelligent display device in which a computer support function is added to a broadcast reception function. The intelligent display device may have a more user-friendly interface such as a handwriting-type input device, a touch screen, or a space remote control as an Internet function is added while being faithful to the broadcast reception function. In addition, the display device may be connected to Internet and a computer as a wired or wireless Internet function is supported, thereby performing functions such as an e-mail, web browsing, banking, or a game. A standardized universal OS may be used for such various functions.

Therefore, because various applications may be freely added to or deleted from the display device described in the present disclosure, for example, a general-purpose OS kernel, various user-friendly functions may be performed. More specifically, the display device may be, for example, a network TV, an HBBTV, a smart TV, and the like, and may also be applied to a smart phone in some cases.

FIG. 12 is a block diagram for illustrating each component of a display device 100 according to an embodiment of the present disclosure.

The display device 100 may include a broadcast receiver 1210, an external device interface 171, a network interface 172, storage 140, a user input interface 173, an input unit 130, and a controller 180, a display module 150, an audio output unit 160, and/or a power supply 190.

The broadcast receiver 1210 may include a tuner 1211 and a demodulator 1212.

Unlike the drawing, the display device 100 may include only the external device interface 171 and the network interface 172 among the broadcast receiver 1210, the external device interface 171, and the network interface 172. That is, the display device 100 may not include the broadcast receiver 1210.

The tuner 1211 may select a broadcast signal corresponding to a channel selected by the user or all pre-stored channels among broadcast signals received via an antenna (not shown) or a cable (not shown). The tuner 1211 may convert the selected broadcast signal into an intermediate-frequency signal or a base band image or audio signal.

For example, when the selected broadcast signal is a digital broadcast signal, the tuner 1211 may convert the digital broadcast signal into a digital IF signal (DIF), and when the selected broadcast signal is an analog broadcast signal, the tuner 1211 may convert the analog broadcast signal into an analog base band image or audio signal (CVBS/SIF). That is, the tuner 1211 may process the digital broadcast signal or the analog broadcast signal. The analog base band image or audio signal (CVBS/SIF) output from the tuner 1211 may be directly input to the controller 180.

In one example, the tuner 1211 may sequentially select broadcast signals of all stored broadcast channels via a channel memory function among the received broadcast signals, and convert the selected signals into the intermediate-frequency signal or the base band image or audio signal.

In one example, the tuner 1211 may include a plurality of tuners to receive broadcast signals of a plurality of channels. Alternatively, the tuner 1211 may be a single tuner that simultaneously receives the broadcast signals of the plurality of channels.

The demodulator 1212 may receive the digital IF signal (DIF) converted by the tuner 1211 and perform a demodulation operation. The demodulator 1212 may output a stream signal (TS) after performing demodulation and channel decoding. In this regard, the stream signal may be a signal in which an image signal, an audio signal, or a data signal is multiplexed.

The stream signal output from the demodulator 1212 may be input to the controller 180. The controller 180 may output an image via the display module 150 and output an audio via the audio output unit 160 after performing demultiplexing, image/audio signal processing, and the like.

A sensing unit 120 refers to a device that senses a change in the display device 100 or an external change. For example, the sensing unit 120 may include at least one of a proximity sensor, an illumination sensor, a touch sensor, an infrared (IR) sensor, an ultrasonic sensor, an optical sensor (e.g., a camera), a voice sensor (e.g., a microphone), a battery gauge, and an environment sensor (e.g., a hygrometer, a thermometer, and the like).

The controller 180 may check a state of the display device 100 based on information collected by the sensing unit 120, and when a problem occurs, the controller 180 may notify the user of the problem or may make adjustments on its own to control the display device 100 to maintain the best state.

In addition, a content, an image quality, a size, and the like of the image provided by the display module 150 may be controlled differently based on a viewer sensed by the sensing unit, a surrounding illumination, or the like to provide an optimal viewing environment. As a smart TV progresses, the number of functions of the display device increases and the number of sensing units 20 also increases together.

The input unit 130 may be disposed at one side of a main body of the display device 100. For example, the input unit 130 may include a touch pad, a physical button, and the like. The input unit 130 may receive various user commands related to an operation of the display device 100 and transmit a control signal corresponding to the input command to the controller 180.

Recently, as a size of a bezel of the display device 100 decreases, the number of display devices 100 in a form in which the input unit 130 in a form of a physical button exposed to the outside is minimized is increasing. Instead, the minimized physical button may be located on a rear surface or a side surface of the display device 100, and a user input may be received from a remote control device 200 via the touch pad or the user input interface 173 to be described later.

The storage 140 may store programs for processing and controlling each signal in the controller 180, or may store signal-processed image, audio, or data signals. For example, the storage 140 may store application programs designed for the purpose of performing various tasks processable by the controller 180, and may selectively provide some of the stored application programs upon request from the controller 180.

The programs stored in the storage 140 are not particularly limited as long as they may be executed by the controller 180. The storage 140 may also perform a function for temporarily storing the image, audio, or data signals received from an external device via the external device interface 171. The storage 140 may store information on a predetermined broadcast channel via the channel memory function such as a channel map.

FIG. 12 shows an embodiment in which the storage 140 is disposed separately from the controller 180, but the scope of the present disclosure is not limited thereto, and the storage 140 is able to be included in the controller 180.

The storage 140 may include at least one of a volatile memory (e.g., a DRAM, a SRAM, a SDRAM, and the like) or a non-volatile memory (e.g., a flash memory, a hard disk drive (HDD), a solid-state drive (SSD), and the like).

The display module 150 may generate a driving signal by converting the image signal, the data signal, an OSD signal, and a control signal processed by the controller 180 or the image signal, the data signal, a control signal, and the like received from the interface 171. The display module 150 may include the display panel 11 having the plurality of pixels.

The plurality of pixels disposed on the display panel may include RGB sub-pixels. Alternatively, the plurality of pixels disposed on the display panel may include RGBW sub-pixels. The display module 150 may generate driving signals for the plurality of pixels by converting the image signal, the data signal, the OSD signal, the control signal, and the like processed by the controller 180.

The display module 150 may be a plasma display panel (PDP), a liquid crystal display (LCD), an organic light emitting diode (OLED), a flexible display module, and the like, or may be a three-dimensional (3D) display module.

The 3D display module 150 may be classified into a non-glasses type and a glasses type.

The display device 100 includes the display module that occupies most of the front surface thereof and a casing that covers a rear surface, a side surface, and the like of the display module and packages the display module.

Recently, the display device 100 may use the display module 150 that may be bent such as the light emitting diode (LED) or the organic light emitting diode (OLED) to realize a curved screen in addition to a flat screen.

The LCD, which was mainly used in the past, received light via a backlight unit because it was difficult for the LCD to emit light on its own. The backlight unit is a device that uniformly supplies light supplied from a light source to a liquid crystal located in the front. As the backlight unit became thinner, it was possible to realize a thin LCD, but it was difficult to implement the backlight unit with a flexible material, and when the backlight unit is bent, it was difficult to uniformly supply the light to the liquid crystal, resulting in a change in brightness of the screen.

On the other hand, the LED or the OLED may be implemented to be bendable because each element constituting the pixel emits light on its own and thus the backlight unit is not used. In addition, because each element emits light on its own, even when a positional relationship with a neighboring element changes, brightness thereof is not affected, so that the display module 150 that is bendable using the LED or the OLED may be implemented.

The organic light emitting diode (OLED) panel appeared in earnest in mid-2010 and is rapidly replacing the LCD in a small and medium-sized display market. The OLED is a display made using a self-luminous phenomenon of emitting light when current flows through a fluorescent organic compound. The OLED has a higher image quality response speed than the LCD, so that there is almost no afterimage when realizing a moving image.

The OLED is a light-emitting display product that uses three types (red, green, and blue) of phosphor organic compounds having a self-luminous function, and uses a phenomenon in which electrons and positively charged particles injected from a cathode and an anode are combined with each other within an organic material to emit light by itself, so that there is no need for a backlight (a backlight device) that deteriorates color.

The light emitting diode (LED) panel, as a technology that uses one LED element as one pixel, may reduce a size of the LED element compared to the prior art, and thus, may implement the display module 150 that is bendable. A device referred to as an LED TV in the past only used the LED as the light source for the backlight unit that supplies the light to the LCD, and the LED itself was not able to constitute the screen.

The display module includes the display panel, and a coupling magnet, a first power supply, and a first signal module positioned on a rear surface of the display panel. The display panel may include a plurality of pixels R, G, and B. The plurality of pixels R, G, and B may be formed in respective areas where multiple data lines and multiple gate lines intersect each other. The plurality of pixels R, G, and B may be disposed or arranged in a matrix form.

For example, the plurality of pixels R, G, and B may include a red (hereinafter, 'R') sub-pixel, a green ('G') sub-pixel, and a blue ('B') sub-pixel. The plurality of pixels R, G, and B may further include a white (hereinafter, 'W') sub-pixel.

In the display module 150, a side on which the image is displayed may be referred to as a front side or a front surface. When the display module 150 displays the image, a side on which the image is not able to be observed may be referred to as a rear side or a rear surface.

In one example, the display module 150 may be constructed as the touch screen and may be used as the input device in addition to the output device.

The audio output unit 160 receives an audio-processed signal from the controller 180 and outputs the received signal as the audio.

An interface 170 serves as a passage for various types of external devices connected to the display device 100. The interface may be in a wireless scheme using the antenna as well as a wired scheme of transmitting and receiving data via the cable.

The interface 170 may include at least one of a wired/wireless headset port, an external charger port, a wired/wireless data port, a memory card port, a port for connecting a device having an identification module, an audio input/output (I/O) port, a video input/output (I/O) port, and an earphone port.

An example of the wireless scheme may include the broadcast receiver 1210 described above, and may include not only the broadcast signal, but also a mobile communication signal, a short-distance communication signal, a wireless Internet signal, and the like.

The external device interface 171 may transmit or receive data with a connected external device. To this end, the external device interface 171 may include an A/V input/output unit (not shown).

The external device interface 171 may be connected to the external device such as a digital versatile disk (DVD), a Blu-ray, a game console, a camera, a camcorder, a computer (a laptop), a set-top box, and the like in a wired/wireless manner, and may perform input/output operations with the external device.

In addition, the external device interface 171 may establish a communication network with various remote control devices 200 to receive a control signal related to the operation of the display device 100 from the remote control device 200 or to transmit data related to the operation of the display device 100 to the remote control device 200.

The external device interface 171 may include a wireless communication unit (not shown) for short-range wireless communication with other electronic devices. With such a wireless communication unit (not shown), the external device interface 171 may exchange data with an adjacent mobile terminal. In particular, the external device interface 171 may receive device information, running application information, an application image, and the like from the mobile terminal in a mirroring mode.

The network interface 172 may provide an interface for connecting the display device 100 to a wired/wireless network including an Internet network. For example, the network interface 172 may receive content or data provided by the Internet, a content provider, or a network operator via the network. In one example, the network interface 172 may include a communication module (not shown) for connection to the wired/wireless network.

The external device interface 171 and/or the network interface 172 may include a communication module for the short-range communication such as a wireless fidelity (Wi-Fi), a Bluetooth, a Bluetooth low energy (BLE), a Zigbee, and a near field communication (NFC), a communication module for cellular communication such as a long-term evolution (LTE), an LTE advance (LTE-A), a code division multiple access (CDMA), a wideband CDMA (WCDMA), a universal mobile telecommunications system (UMTS), and a wireless broadband (WiBro), and the like.

The user input interface 173 may transmit a signal input by the user to the controller 180 or transmit a signal from the controller 180 to the user. For example, a user input signal such as power ON/OFF, channel selection, screen setting, and the like may be transmitted/received to/from the remote control device 200, a user input signal input from a local key (not shown) such as a power key, a channel key, a volume key, a setting value, and the like may be transmitted to the controller 180, a user input signal input from a sensor unit (not shown) that senses a gesture of the user may be transmitted to the controller 180, or a signal from the controller 180 may be transmitted to the sensor unit.

The controller 180 may include at least one processor, and may control overall operations of the display device 100 using the processor included therein. In this regard, the processor may be a general processor such as a central processing unit (CPU). In one example, the processor may be a dedicated device such as an ASIC or a processor based on other hardware.

The controller 180 may demultiplex the stream input via the tuner 1211, the demodulator 1212, the external device interface 171, or the network interface 172, or process a demultiplexed signal to generate or output a signal for image or audio output.

The image signal image-processed by the controller 180 may be input to the display module 150 and displayed as an image corresponding to the corresponding image signal. In addition, the image signal image-processed by the controller 180 may be input to an external output device via the external device interface 171.

The audio signal processed by the controller 180 may be output as the audio via the audio output unit 160. In addition, the audio signal processed by the controller 180 may be input to the external output device via the external device interface 171. In addition, the controller 180 may include a demultiplexer, an image processor, and the like.

In addition, the controller 180 may control overall operations within the display device 100. For example, the controller 180 may control the tuner 1211 to select (tune) a broadcast corresponding to the channel selected by the user or the pre-stored channel.

In addition, the controller 180 may control the display device 100 in response to a user command input via the user input interface 173 or by an internal program. In one example, the controller 180 may control the display module 150 to display the image. In this regard, the image displayed on the display module 150 may be a still image or a moving image, and may be a 2D image or a 3D image.

In one example, the controller 180 may allow a predetermined 2D object to be displayed within the image displayed on the display module 150. For example, the object may be at least one of a connected web screen (a newspaper, a magazine, and the like), an electronic program guide (EPG), various menus, a widget, an icon, the still image, the moving image, and a text.

In one example, the controller 180 may modulate and/or demodulate a signal using an amplitude shift keying (ASK) scheme. Here, the amplitude shift keying (ASK) scheme may refer to a scheme of modulating the signal by varying an amplitude of a carrier wave based on a data value or restoring an analog signal to a digital data value based on to the amplitude of the carrier wave.

For example, the controller 180 may modulate the image signal using the amplitude shift keying (ASK) scheme and transmit the modulated image signal via a wireless communication module.

For example, the controller 180 may demodulate and process the image signal received via the wireless communication module using the amplitude shift keying (ASK) scheme.

Therefore, the display device 100 may easily transmit and receive a signal with another image display device disposed adjacent thereto without using a unique identifier such as a media access control address (MAC address) or a complex communication protocol such as TCP/IP.

In one example, the display device 100 may further include a photographing unit (not shown). The photographing unit may photograph the user. The photographing unit may be implemented with one camera, but may not be limited thereto, and may be implemented with a plurality of cameras. In one example, the photographing unit may be embedded in the display device 100 or disposed separately upwardly of the display module 150. Information on the image photographed by the photographing unit may be input to the controller 180.

The controller 180 may recognize a location of the user based on the image photographed by the photographing unit. For example, the controller 180 may identify a distance between the user and the display device 100 (a z-axis coordinate). In addition, the controller 180 may determine an x-axis coordinate and a y-axis coordinate within the display module 150 corresponding to the location of the user.

The controller 180 may sense the gesture of the user based on the image photographed by the photographing unit or the signal sensed by the sensor unit, or a combination thereof.

The power supply 190 may supply the corresponding power throughout the display device 100. In particular, the power may be supplied to the controller 180 that may be implemented in a form of a system on chip (SOC), the display module 150 for displaying the image, the audio output unit 160 for outputting the audio, and the like.

Specifically, the power supply 190 may include a converter (not shown) that converts AC power to DC power and a Dc/Dc converter (not shown) that converts a level of the DC power.

In one example, the power supply 190 serves to receive the power from the outside and distribute the power to each component. The power supply 190 may use a scheme of supplying the AC power in direct connection to an external power source, and may include a power supply 190 that may be charged and used by including a battery.

In a case of the former, the power supply is used in connection with the cable, and has difficulties in moving or is limited in a movement range. In a case of the latter, the movement is free, but a weight and a volume of the power supply increase as much as those of the battery, and the power supply must be directly connected to a power cable for a certain period of time for charging or coupled to a charging cradle (not shown) that supplies the power.

The charging cradle may be connected to the display device via a terminal exposed to the outside, or the built-in battery may be charged using a wireless scheme when approaching the charging cradle.

The remote control device 200 may transmit the user input to the user input interface 173. To this end, the remote control device 200 may use the Bluetooth, a radio frequency (RF) communication, an infrared radiation (IR) communication, an ultra-wideband (UWB), the ZigBee, or the like. In addition, the remote control device 200 may receive the image, audio, or data signal output from the user input interface 173 and display the same thereon or output the same as audio.

In one example, the display device 100 described above may be a fixed or mobile digital broadcast receiver that may receive a digital broadcast.

The block diagram of the display device 100 shown in FIG. 12 is only a block diagram for one embodiment of the present disclosure, and each component of the block diagram is able to be integrated, added, or omitted based on specifications of the display device 100 that is actually implemented.

That is, when necessary, two or more components may be combined to each other into one component, or one component may be subdivided into two or more components. In addition, functions performed in each block are for illustrating the embodiment of the present disclosure, and a specific operation or a device thereof does not limit the scope of rights of the present disclosure.

The new form-factor of the TV shown in FIGS. 1 to 12 above has an advantage in that the TV may be easily moved indoors.

On the other hand, a new form-factor of the TV suitable for an outdoor long-distance movement, an outdoor camping site, or the like will be described in more detail with reference to FIGS. 13 to 16 below. In one example, designing some or all of the components shown in FIG. 12 to be included in a device shown in FIGS. 13 to 16 also belongs to another scope of rights of the present disclosure.

FIG. 13 is a diagram showing a display device according to an embodiment of the present disclosure. Hereinafter, redundant descriptions duplicate with the above descriptions will be omitted.

Referring to FIG. 13, the display device 100 has the display module 150 accommodated inside a housing 210. In this regard, the housing 210 may include an upper casing 210*a* and a lower casing 210*b*, and the upper casing 210*a* and the lower casing 210*b* may have a structure of being opened and closed.

In one embodiment, the audio output unit 160 may be included in the upper casing 210*a* of the display device 100, and the main board that is the controller 180, a power board, the power supply 190, the battery, the interface 170, the sensing unit 120, and the input unit (including the local key) 130 may be accommodated in the lower casing 210*b*. In this regard, the interface 170 may include a Wi-Fi module, a Bluetooth module, an NFC module, and the like for the communication with the external device, and the sensing unit 120 may include an illuminance sensor and an IR sensor.

In one embodiment, the display module 150 may include a DC-DC board, a sensor, and a low voltage differential signaling (LVDS) conversion board.

In addition, in one embodiment, the display device 100 may further include four detachable legs 220*a*, 220*b*, 220*c*, and 220*d*. In this regard, the four legs 220*a*, 220*b*, 220*c*, and 220*d* may be attached to the lower casing 210*b* to space the display device 100 from the floor.

FIG. 14 is a diagram showing an example of utilization of a display device according to an embodiment of the present disclosure. Hereinafter, redundant descriptions duplicate with the above descriptions will be omitted.

In the embodiment of FIG. 14, the display device 100 represents an example of utilization that does not include the legs. Referring to FIG. 14, the display device 100 has the structure in which the display module is mounted in the upper casing and the lower casing as described above, and is able to be changed into a structure that may be carried like a bag when the upper casing and the lower casing are closed.

In one embodiment, the display device 100 may include a handle 300 on the upper casing or the lower casing. In this regard, the handle 300 may have a structure attached to left and right side surfaces of the upper casing or the lower casing such that the user may lift the housing with the closed upper casing and lower casing. In this regard, the handle 300 may be made of a material that is easy for the user to hold in the hand, such as leather or plastic.

That is, the display device 100 includes the handle 300 with the upper casing or the lower casing closed, so that the user may easily carry and move the display device 100.

In addition, when necessary, the user may use the mounted display module 150 by placing the lower casing on the floor and opening the upper casing. This will be described in detail with reference to FIGS. 15 and 16.

In addition, in one embodiment, the display device 100 may further include an accommodating space 310 at the side surface of the lower casing. In this regard, the accommodating space 310 may include the various modules described above in FIG. 12. In addition, the accommodating space 310 may include a space for accommodating a touch-pen, a wireless earphone, or the like.

FIG. 15 is another diagram showing an example of utilization of a display device according to an embodiment of the present disclosure. Hereinafter, redundant descriptions duplicate with the above descriptions will be omitted.

In one embodiment of the present disclosure, the display device 100 may include four legs. In this regard, the four legs are attached to the lower casing to space the display device 100 from the floor.

Accordingly, the user may not only use the display device 100 while moving the same, but also use the same at a fixed location away from the floor.

(a) to (d) in FIG. 15 show an example of utilization in which the legs of the display device 100 are attached and the display device 100 is used at the fixed location. In this regard, (a) in FIG. 15 shows a state in which the upper casing of the display device 100 is closed, and (b) to (d) in FIG. 15 show a state in which the upper casing is opened.

Specifically, (b) in FIG. 15 shows a state in which the display module 150 is accommodated in the lower casing with the upper casing open. In other words, (b) in FIG. 15 shows a state in which the display module 150 lies inside the lower casing with the upper casing open. Even in the state in which the display module 150 is accommodated in the lower casing, the display module 150 may be activated.

In one embodiment, the display device 100 may provide an edit mode while the display module 150 is accommodated in the lower casing. In this regard, the edit mode may include a function of adding at least one of a memo function, a drawing function, and a voice recording function to a content.

That is, when the display module 150 is mounted on the lower casing, the display device 100 may determine that the user intends to appreciate/watch the content via the display module 150.

On the other hand, when the display module 150 is accommodated in the lower casing, the display device 100 may determine that the user intends to edit the content output on the display module 150. Accordingly, the display device 100 may provide a function of editing the content when the display module 150 is accommodated in the lower casing.

(c) in FIG. 15 shows a state in which the display module 150 is horizontally mounted on the lower casing with the upper casing open, and (d) in FIG. 15 shows a state in which the display module 150 is vertically mounted on the lower casing with the upper casing open. In this regard, (c) and (d) in FIG. 15 show a state in which the display module 150 is erected using the lower casing as a foothold.

In addition, in one embodiment, the display device 100 may automatically accommodate or mount the display module 150 in or on the lower casing using a motor (not shown).

More specifically, when the upper casing of the display device 100 is opened, the display module 150 may be automatically mounted horizontally or vertically on the lower casing.

In addition, in another embodiment, when the upper casing of the display device 100 is opened, the display module 150 may be primarily accommodated on the lower casing. Thereafter, the display device 100 may mount the display module 150 on the lower casing in response to a signal of touching the display module 150 and a signal input from the sensing unit or the input unit. For example, the user may mount the display module 150 on the lower casing by pressing the display module 150 accommodated inside the lower casing downwardly. This will be described in detail with reference to FIG. 16.

FIG. 16 is a diagram showing front and side surfaces of a display device according to an embodiment of the present disclosure. Hereinafter, redundant descriptions duplicate with the above descriptions will be omitted.

(a) and (b) in FIG. 16 show a state in which the display module 150 is mounted vertically, and (c) and (d) in FIG. 16 show a state in which the display module 150 is mounted horizontally.

(a) and (c) in FIG. 16 are views showing the display device 100 from the front, and (b) and (d) in FIG. 16 are views showing the display device 100 from the side.

In one embodiment, because the upper casing may include the audio output unit 160, in (a) in FIG. 16, the display module 150 may be mounted vertically and there may be the upper casing including the audio output unit 160 at the rear of the display module 150.

Referring to (b) in FIG. 16, the display device 100 may further include a support member 500 to vertically mount the display module 150 on the lower casing. That is, when the display device 100 is viewed from the side as shown in (b) in FIG. 16, the support member 500 may be included in the lower casing and may be designed in a foldable structure to vertically mount the display module 150. In this regard, the support member 500 may be controlled by the motor of the display device 100 and may be operated manually by the user's hand.

Referring to (c) in FIG. 16, the display device 100 may have the display module 150 mounted thereon horizontally and the audio output unit 160 at the rear of the display module 150.

Referring to (d) in FIG. 16, the display device 100 may include the support member 500 to horizontally mount the display module 150 on the lower casing. In this regard, the support member 500 may be the same as the support member 500 in (b) in FIG. 16, but may be in a state in which a hinge 510 included in the support member 500 is folded more to horizontally mount the display module 150.

In addition, in one embodiment, the display module 150 may be manually mounted horizontally or vertically by the user's hand. In another embodiment, the display module 150 may be mounted horizontally or vertically on the lower casing in response to the control of the display device 100. In this regard, the display device 100 may mount the display module 150 horizontally or vertically based on the control signal of the user (sensed via the sensing unit or the input unit).

In one example, the TV based on the new form-factor needs to be designed to cope with unexpected noise from a peripheral device because of mobility. A solution related thereto will be described with reference to FIGS. 17 to 23 below.

FIG. 17 is a diagram for illustrating a process of adjusting a volume of audio data when a movable TV according to an embodiment of the present disclosure is located near a specific external device.

First, as shown in (a) in FIG. 17, according to an embodiment of the present disclosure, a movable TV 1710 is outputting audio data and video data of content at a first location. In this regard, it is assumed that video data initially set by the user corresponds to a channel 10 and a volume of the audio data is 10. Furthermore, at the first location, because the TV 1710 and a washing machine 1720, which is an example of the external device, are far apart from each other, noise caused by an operation of the washing machine is not a problem.

However, because the TV 1710 according to an embodiment of the present disclosure is movable as described above, the noise caused by the washing machine may be a problem.

For example, as shown in (b) in FIG. 17, it is assumed that a TV 1711 according to an embodiment of the present disclosure has moved from the first location to a second location.

Then, state information of a washing machine 1721, which is an external device belonging to a specific group located around the second location, is received. In this regard, based on the received state information, whether to adjust a volume of audio data is determined (however, it is designed to maintain output of video data).

For example, in (b) in FIG. 17, when the washing machine 1721 does not operate or does not generate noise, the volume of the audio data output from the TV 1711 is maintained without being adjusted.

On the other hand, it is designed that, when a washing machine 1722 shown in (c) in FIG. 17 is performing a washing or rinsing function generating noise, a volume of audio data output by a TV 1712 is automatically increased. Therefore, there is an advantage in that the user may identify the same level of sound no matter where the movable TV is moved by the user.

In one example, FIG. 17 relates to the embodiment of automatically adjusting the volume of the audio data when the TV according to an embodiment of the present disclosure has moved to the specific location (when there is another device that generates the noise), whereas FIG. 18 to be described below relates to an embodiment of automatically adjusting the volume of the audio data while the TV is moving.

FIG. 18 is a diagram for illustrating a process of adjusting a volume of audio data while a movable TV according to an embodiment of the present disclosure moves.

First, as shown in (a) in FIG. 18, it is assumed that an audio volume is set to 10 while a TV 1810 according to an embodiment of the present disclosure outputs a broadcast program.

When a motion of a TV 1820 is sensed, as shown in (b) in FIG. 18, a volume level of audio data of content (e.g., the broadcast program) is lowered (changed from 10 to 5), and further the TV 1820 outputs a guide voice notifying that the TV is moving. With such design, a person may be prevented from being injured while the TV is moving.

In particular, by designing the volume level (5) of the audio data of the content that has been output to be at least two times smaller than a volume level (10) of the guide voice as shown in (b) in FIG. 18, there is an advantage in that the user is able to more reliably recognize the situation that the TV is moving.

Furthermore, when the motion of the TV is not sensed for a predetermined time (e.g., 1 to 3 seconds) or more, as shown in (c) in FIG. 18, it is controlled that the TV increases the volume level of the audio data of the content (restores the original volume level 10 shown in (a) in FIG. 18), the output of the guide voice notifying that the TV is moving is stopped. In particular, in the present disclosure, the guide voice output is not stopped immediately when the TV is stopped, which is a design taking into account the fact that the user often finely adjusts the TV after moving the TV to another place.

FIG. 19 is a diagram for illustrating a process in which a movable TV according to an embodiment of the present disclosure receives noise information of an external device.

In particular, as described above with reference to FIG. 17, in the TV according to an embodiment of the present disclosure, it is important to check which external device exists in the environment of the moved location of the TV and what state the external device is in. This is because there is no need to consider an external device and a state thereof that do not affect the audio output via the speaker of the TV.

As shown in FIG. 19, a TV 1900 according to an embodiment of the present disclosure is designed to receive state information/noise information and the like from an external device belonging to a specific group.

In this regard, the external device belonging to the specific group defined by the present disclosure includes not only at least one external device having a speaker, but also at least one external device that does not have a speaker but is able to generate noise resulted from vibration.

Accordingly, the TV 1900 is designed to receive state information from a washing machine 1910, a dryer 1920, a microwave oven 1930, and a dishwasher 1940 that have speakers or generate noise resulted from vibration. In addition, a volume of audio data is adjusted based on the state information of the external device of the specific group in a place where the moved TV is located.

To realize the same, data as shown in Table 1 below is stored in a memory of the TV or a server.

TABLE 1

| Device type | Whether it belongs to specific group | Whether it needs to receive state information |
|---|---|---|
| Washing machine | O | O |
| Dryer | O | O |
| Microwave oven | O | O |
| Dishwasher | O | O |
| Electronic album | X | X |
| Electric light | X | X |

FIG. 19 shows an assumed case in which the TV 1900 is in direct communication with other devices, but designing the devices to transmit/receive data with each other via the server also belongs to another scope of rights of the present disclosure.

In addition, as shown in Table 2 below, the TV is designed to receive detailed state information from the device (e.g., the washing machine) belonging to the specific group.

Therefore, the TV moved near the washing machine at 10:45 am on Jan. 1, 2022 does not adjust the volume of the audio data even though the washing machine is in operation. This is because the washing machine hardly generates the noise at the corresponding time as a result of referring to data in Table 2 below.

On the other hand, it is designed that, when the TV is located near the washing machine on Jan. 1, 2022 between 9:00 am and 10:30 am, the volume of the audio data that has been output is automatically increased.

Furthermore, although not shown in Table 2 below, designing to increase the volume up to 2-3 seconds before and after an expected noise generation time for a safety margin also falls within another scope of rights of the present disclosure.

TABLE 2

| Washing machine operation timeline | Executed function | Expected noise |
|---|---|---|
| Jan. 1, 2022, 9 am-10 am | Function A | 20 dB. |
| Jan. 1, 2022, 10:00 am-10:30 am | Function B | 10 dB. |
| Jan. 1, 2022, 10:30 am-11:00 am | Function C | x |

In one example, it is also possible to design the TV to more specifically calculate a distance to another noise generating device by adding a distance sensor to the TV. In addition, the expected noise in Table 2 above assumes that the TV and the corresponding external device are located at a spacing of, for example, 1 m, but those skilled in the art may change the design based on other standards, and this is also included in the technical idea of the present disclosure.

That is, according to the embodiment shown in FIG. 19 and Table 1/Table 2, the TV receives the noise information based on the state information of the external device belonging to the specific group from the server or the external device, and adjusts the volume level of the audio data based on the received noise information.

However, the noise information for each state of the external device may not be received because of instability of a network state or the like, and an embodiment in preparation for such situation will be described later with reference to FIG. 20 below.

FIG. 20 is a diagram for illustrating a process in which a movable TV according to an embodiment of the present disclosure learns a noise level of an external device.

As shown in FIG. 20, when a TV 2000 approaches two external devices 2030 and 2040, the TV 2000 receives operating state information and corresponding noise information of each device. In addition, it is designed to comprehensively calculate a noise level and increase a volume of the TV based on the received data.

However, there may occur a case in which the TV receives the operating state information from the corresponding devices, but fails to receive the noise information or the like.

In this regard, the TV 2000 is designed to learn a pattern of noise generated by the external devices 2030 and 2040.

The TV 2000 maps the state information of the external device and the learned pattern information of the noise to each other and stores them in a memory.

Accordingly, when the TV 2000 later receives only the state information of the external device belonging to the specific group and does not receive the noise information, the TV 2000 is designed to generate and output a destructive interference wave based on the pattern information of the noise stored in the memory.

FIG. 21 is a flowchart illustrating a method for controlling a movable TV according to an embodiment of the present disclosure.

It is assumed that the movable TV according to an embodiment of the present disclosure is outputting the audio data and the video data of the content at the first location (S2110).

When the TV moves from the aforementioned first location to the second location (S2120), it is designed to receive the state information of the external device belonging to the specific group located around the second location (S2130). As described in detail in Tables 1 and 2 above, redundant descriptions will be omitted.

In addition, the movable TV according to an embodiment of the present disclosure adjusts the volume level of the audio data while maintaining the output of the video data based on the received state information (S2140).

FIG. 22 is a flowchart showing another process for realizing S2120 shown in FIG. 21.

As described above, the TV according to an embodiment of the present disclosure is movable unlike in the prior art.

It is determined whether the motion is sensed via wheels or the like installed on the TV (S2210). When the motion of the TV is sensed as a result of the determination, the volume level of the audio data of the content is lowered and the guide voice notifying that the TV is moving is output (S2220).

In addition, when the motion of the TV is completed, there is no need to output the above-described guide voice, so that it is designed to determine whether there is the motion of the TV for a predetermined time period or more (S2230).

When the motion of the TV is not sensed for the predetermined time period or more as a result of the determination, it is controlled that the volume level of the audio data of the content is raised again and the output of the guide voice notifying that the TV is moving is stopped (S2240).

In addition, FIG. 23 is a flowchart showing another process of realizing S2130 shown in FIG. 21.

The TV according to an embodiment of the present disclosure determines whether the noise information based on the state information of the external device (the device having the speaker or generating the noise resulted from the vibration or the like as described above) belonging to the specific group is received from the server or the corresponding device (S2310).

When the noise information based on the state information of the external device belonging to the specific group is received from the server or the like, the TV is designed to adjust the volume level of the audio data based on the received noise information (S2320).

On the other hand, when the noise information based on the state information of the external device belonging to the specific group is not received from the server or the like, the TV learns the pattern of the noise generated by the external device (S2330), and maps the state information of the external device and the learnt pattern information of the noise to each other and stores them in the memory (S2340).

Then, the TV placed in the same situation later generates and outputs the destructive interference wave based on the pattern information of the noise stored in the memory (S2350). With such design, there is a technical effect that the TV does not need to adjust the audio volume of the broadcast program that has been output.

In one example, although the method invention has been mainly illustrated in FIGS. 21 to 23, realizing the same as a TV product invention also belongs to the scope of rights of the present disclosure.

The movable TV according to an embodiment of the present disclosure includes the tuner, the speaker, the display, the moving member, the network interface, the controller, and the like.

First, the tuner receives the broadcast signal. The tuner corresponds to the tuner 1211 shown in FIG. 12, for example.

The speaker outputs the audio data of the content contained in the broadcast signal at the first location. The speaker corresponds to the audio output unit 160 shown in FIG. 12, for example.

The display outputs the video data of the content contained in the broadcast signal at the first location. The display corresponds to, for example, the display module 150 shown in FIG. 12.

The moving member may move the TV from the first location to the second location, and is implemented as four wheels on a rear surface of the base 20 shown in FIG. 1, for example.

The network interface receives the state information of the external device belonging to the specific group located around the second location. For example, the network interface corresponds to the network interface 172 shown in FIG. 12.

In addition, the controller adjusts the volume level of the audio data while maintaining the output of the video data based on the received state information. For example, the controller corresponds to the controller 180 shown in FIG. 12.

The present disclosure described above may be implemented with computer-readable codes on a medium in which a program is recorded. Computer-readable media include all kinds of recording devices in which data readable by a computer system is stored. Examples of computer-readable media include a hard disk drive (HDD), a solid state disk (SSD), a silicon disk drive (SDD), a ROM, a RAM, a CD-ROM, a magnetic tape, a floppy disk, an optical data storage device, and the like, and also include those implemented in a form of a carrier wave (e.g., transmission over the Internet). In addition, the computer may include a controller. Accordingly, the above detailed description should not be construed as limiting in all respects and should be considered illustrative. The scope of the present disclosure should be determined by reasonable interpretation of the appended claims, and all changes within the equivalent scope of the present disclosure are included in the scope of the present disclosure.

What is claimed is:

1. A method for controlling a movable display apparatus, the method performed by the movable display apparatus including a network interface configured to receive a signal including content, a speaker configured to output audio data of the content, a display configured to output video data of the content, and a controller configured to control output of the audio data and the video data, the method comprising:

outputting the audio data of the content via the speaker and the video data of the content via the display while the display is located at a first location;

in response to the movable display apparatus being moved from the first location to a second location, lowering a volume level of the audio data being output from the speaker to a predetermined volume level and outputting a guide voice indicating that the movable display apparatus is moving;

in response to the movable display apparatus being moved to the second location, receiving state information of an external device located around the second location, wherein the state information indicates noise caused by the external device; and raising a volume level of the audio data being output via the speaker while maintaining the output of the video data via the display according to the received state information.

2. The method of claim 1, wherein the lowered volume level of the audio data is at least two times lower than a volume level of the guide voice.

3. The method of claim 2, further comprising:

raising the volume level of the audio data and no longer outputting the guide voice based on detecting that the movable display apparatus has not been moved for a predetermined time period or more.

4. The method of claim 1, wherein the external device is configured to generate noise from vibration during operation.

5. The method of claim 1, further comprising:

receiving the state information from a plurality of external devices located around the second location, the state information indicating noise caused by the plurality of external devices;

calculating total noise level using the noise caused by the plurality of external devices; and raising the volume level of the audio data being output according to the noise caused by the plurality of external devices.

6. The method of claim 5, further comprising:

learning a pattern of noise caused by at least one of the plurality of external devices when the noise caused by the at least one of the plurality of external devices is not received from a server.

7. The method of claim 6, further comprising:

mapping the state information of the at least one of the plurality of external devices to the learned pattern of the noise and storing the mapping in a memory.

8. The method of claim 7, further comprising:

outputting a destructive interference wave using the stored mapping when the noise caused by the at least one of the plurality of external devices is not received from the server.

9. A movable display apparatus comprising:

a speaker configured to output audio data of content while the display is located at a first location;

a display configured to output video data of the content while the display is located at the first location;

a network interface; and a controller configured to:

detect that the display is being moved from the first location to a second location;

in response to that the movable display apparatus is being moved from the first location to a second location, lower a volume level of the audio data being output from the speaker to a predetermined volume level and output a guide voice indicating that the movable display apparatus is moving;

in response to that the movable display apparatus has been moved to the second location, receive, via the network interface, state information of an external device located around the second location, wherein the state information indicates noise caused by the external device; and raise a volume level of the audio data being output while maintaining the output of the video data according to the noise indicated by the received state information.

10. The movable display apparatus of claim 9, wherein the lowered volume level of the audio data is at least two times less than a volume level of the guide voice.

11. The movable display apparatus of claim 10, wherein the controller is further configured to raise the volume level of the audio data and no longer output the guide voice based on detecting that the movable display apparatus has not been moved for a predetermined time period or more.

12. The movable display apparatus of claim 9, wherein the external device is configured to generate noise from vibration during operation.

13. The movable display apparatus of claim 9, wherein the controller is further configured to:

receive the state information from a plurality of external devices located around the second location, the state information indicating noise caused by the plurality of external devices;

calculate total noise level using the noise caused by the plurality of external devices; and raise the volume level of the audio data being output according to the noise caused by the plurality of external devices.

14. The movable display apparatus of claim 13, wherein the controller is further configured to learn a pattern of noise caused by at least one of the plurality of external devices when the noise caused by the at least one of the plurality of external devices is not received from a server.

15. The movable display apparatus of claim 14, wherein the controller is further configured to:

map the state information of the at least one of the plurality of external devices to the learned pattern of the noise and store the mapping in a memory.

16. The movable display apparatus of claim 15, wherein the controller is further configured to output a destructive interference wave using the stored mapping when the noise caused by the at least one of the plurality of external devices is not received from the server.

* * * * *